(12) United States Patent
Shirasaka et al.

(10) Patent No.: US 9,618,609 B2
(45) Date of Patent: Apr. 11, 2017

(54) OPTICAL SENSOR AND ELECTRONIC DEVICE

(71) Applicant: SHARP KABUSHIKI KAISHA, Osaka-shi, Osaka (JP)

(72) Inventors: Yasuyuki Shirasaka, Osaka (JP); Takayuki Shimizu, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 14/906,768

(22) PCT Filed: Jun. 12, 2014

(86) PCT No.: PCT/JP2014/065588
§ 371 (c)(1),
(2) Date: Jan. 21, 2016

(87) PCT Pub. No.: WO2015/037293
PCT Pub. Date: Mar. 19, 2015

(65) Prior Publication Data
US 2016/0178735 A1    Jun. 23, 2016

(30) Foreign Application Priority Data

Sep. 12, 2013 (JP) .................. 2013-189505

(51) Int. Cl.
| | | |
|---|---|---|
| G01B 11/14 | (2006.01) | |
| G01S 7/481 | (2006.01) | |
| G01S 7/487 | (2006.01) | |
| G01V 8/12 | (2006.01) | |
| G06F 3/01 | (2006.01) | |
| G01S 17/02 | (2006.01) | |

(52) U.S. Cl.
CPC ............. *G01S 7/4811* (2013.01); *G01S 7/487* (2013.01); *G01S 17/026* (2013.01); *G01V 8/12* (2013.01); *G06F 3/01* (2013.01)

(58) Field of Classification Search
CPC ..... G01B 11/026; G01B 11/002; G01B 11/14; G01S 5/163; G01S 5/16
USPC ......................................................... 356/614
See application file for complete search history.

(56) References Cited

U.S. PATENT DOCUMENTS

| | | | |
|---|---|---|---|
| 2012/0280904 A1 | 11/2012 | Skurnik et al. | |
| 2014/0263972 A1* | 9/2014 | Chua .................. | H01L 27/1443 250/208.2 |
| 2015/0036035 A1* | 2/2015 | Wang .................... | H04N 5/363 348/308 |

FOREIGN PATENT DOCUMENTS

| | | |
|---|---|---|
| JP | 2000-75046 A | 3/2000 |
| JP | 2008-8849 A | 1/2008 |

* cited by examiner

*Primary Examiner* — Tarifur Chowdhury
*Assistant Examiner* — Md M Rahman
(74) *Attorney, Agent, or Firm* — Birch, Stewart, Kolasch & Birch, LLP

(57) ABSTRACT

An object is sensed without a malfunction due to disturbance light. An optical sensor (101) of an aspect of the invention includes: a light-emitting element (LED) which turns off and turns on alternately for each one period; a light-receiving element (PD1) which receives reflection light and generates a photocurrent; and an integrating circuit (11) which integrates the photocurrent in a positive direction in a period during which the light-emitting element turns on and integrates the photocurrent in a negative direction in a period during which the light-emitting element turns off. A sum of lengths of integration periods in a first period and a last period is same as a length of another integration period.

5 Claims, 20 Drawing Sheets

301: Light-emitting element
302,303: Light-receiving element
304: Object to be sensed

OPTICAL SENSOR AND ELECTRONIC DEVICE

CROSS-REFERENCE TO RELATED APPLICATIONS

This non-provisional application is a National Stage entry under 35 U.S.C. §371 of International Application No. PCT/JP2014/065588 filed on Jun. 12, 2014, which claims priority to Japanese Patent Application No. 2013-189505 filed in Japan on Sep. 12, 2013. The entire contents of all of the above applications are hereby incorporated by reference.

TECHNICAL FIELD

The present invention relates to an optical sensor that is suitably used as a proximity sensor or a gesture sensor and an electronic device using the same.

BACKGROUND ART

An optical sensor includes a function of, for example, sensing an object to be sensed or detecting a distance from the object to be sensed or the like, and an application field of such optical sensor has become wider.

An electronic device such as a mobile phone (including a smartphone) or a digital camera is provided with a liquid crystal panel for displaying an image thereon. Moreover, as such an electronic device, there is a model including a touch panel in order to allow a touch operation to be performed on the liquid crystal panel. For the electronic device including the liquid crystal panel and the touch panel in this manner, it is necessary to cause the touch panel to operate when performing a normal touch operation, but there is no necessity to cause the touch panel to operate when a face comes close thereto.

Accordingly, in order to reduce power consumption and prevent a malfunction of the touch panel, there is a growing demand for mounting, on the aforementioned electronic device, a proximity sensor so as to stop the operation of the touch panel when a face comes close to the liquid crystal panel. In response to such a demand, for example, in a mobile phone, in order to stop the operation of the touch panel during a call, a proximity sensor which senses that a face of a person comes close to the mobile phone is mounted on an audio output portion, which is put to an ear, of the mobile phone.

In addition, since an output value of a proximity sensor is inversely proportional to a proximity distance, there is a demand for using the proximity sensor as a range-finding sensor.

As an optical sensor that detects a position of an object, for example, PTL 1 describes that, by using a plurality of light-receiving elements, light from a light source is received, and a direction of the light source and a distance to the light source are detected to thereby sense a position of the light source.

Further, there is a demand for, by arranging a plurality of photodiodes in a light-receiving portion of an optical sensor, sensing a motion of an object from an amount of change in an output value of each of the photodiodes.

As an optical sensor that detects a motion of an object, for example, PTL 2 discloses a reflective optical sensor. As illustrated in FIG. 20, this optical sensor is provided with a light-emitting element 301 and two light-receiving elements 302 and 303, and the light-receiving elements 302 and 303 are respectively arranged on both sides of the light-emitting element 301. In a case where an object to be sensed 304 is on the right side, light reflected by the object to be sensed 304 strongly strikes the light-receiving element 303. On the other hand, in a case where the object to be sensed 304 is on the left side, light reflected by the object to be sensed 304 strongly strikes the light-receiving element 302. Thus, by reading a difference in photocurrents generated in the two light-receiving elements 302 and 303, it is possible to detect a position and a motion of the object to be sensed 304.

As to a sensor that detects a motion of an object, there is also a demand for using an optical sensor as a gesture sensor which senses a motion of a hand. Such a gesture sensor is used as an additional function of a proximity sensor, and senses a motion of a hand over a touch panel in a non-contact manner. Thereby, it is possible to perform an operation so as to scroll a screen displayed on a liquid crystal panel without causing a surface of the liquid crystal panel to be dirty even with a wet hand or a dirty hand.

PTL 3 describes a technique which enables sensing a moving direction of an object to be sensed with a sensor composed of one light-emitting element and a segmented photodiode. In a configuration described in PTL 3, metal layers are stacked on a four-segmented photodiode, and each of four light-receiving elements is caused to have directivity of sensitivity in four directions of up and down and right and left directions. By taking up-and-down differences and right-and-left differences as to signals from the four light-receiving elements, the moving direction of the object to be sensed may be specified.

CITATION LIST

Patent Literature

PTL 1: Japanese Unexamined Patent Application Publication No. 2008-8849 (published on Jan. 17, 2008)
PTL 2: Japanese Unexamined Patent Application Publication No. 2000-75046 (published on Mar. 14, 2000)
PTL 3: Specification of U.S. Patent Application Publication No. 2012/0280904 (published on Nov. 8, 2012)

SUMMARY OF INVENTION

Technical Problem

An electronic device, on which a proximity sensor is mounted, as above is used outdoors or indoors in many cases. Therefore, the electronic device is required to cause the proximity sensor to operate accurately even when a disturbance light component due to natural light, illumination light, or the like enters the proximity sensor. Accordingly, it is necessary for the proximity sensor not to malfunction due to external light. As above, the proximity sensor which is used under an environment in which strong disturbance light of natural light, illumination light, or the like is radiated needs to have high resistance to the disturbance light, compared to a general proximity sensor.

However, each of PTLs 1 to 3 does not include description about a specific countermeasure for preventing malfunction of the optical sensor due to the disturbance light.

The invention has been made in view of the aforementioned problem, and aims to provide an optical sensor capable of sensing an object without malfunctioning due to disturbance light.

Solution to Problem

In order to solve the aforementioned problem, an optical sensor according to an aspect of the invention includes: a light-emitting element which turns off and turns on alternately for each of a plurality of continuous periods constituting a period group; a light-receiving element which receives light emitted from the light-emitting element and reflected by an object to be sensed and which generates a photocurrent; and an integrating unit which integrates the photocurrent in a first polarity direction in a period during which the light-emitting element turns on and integrates the photocurrent in a second polarity direction opposite to the first polarity direction in a period during which the light-emitting element turns off, in which a sum of a length of an integration period in a first period of the period group and a length of an integration period in a last period of the period group is same as a length of one integration period in a period other than the first period and the last period in the period group.

Advantageous Effects of Invention

According to an aspect of the invention, it is possible to reduce an influence of disturbance light and to prevent a malfunction.

DESCRIPTION OF EMBODIMENTS

Embodiments of the invention will be described below based on drawings. For convenience of description, in each section, same reference signs are assigned to members having the same functions as those of members described in other sections, which has been described, as appropriate in some cases.

Embodiment 1

Configuration of Optical Sensor

Figure 1:
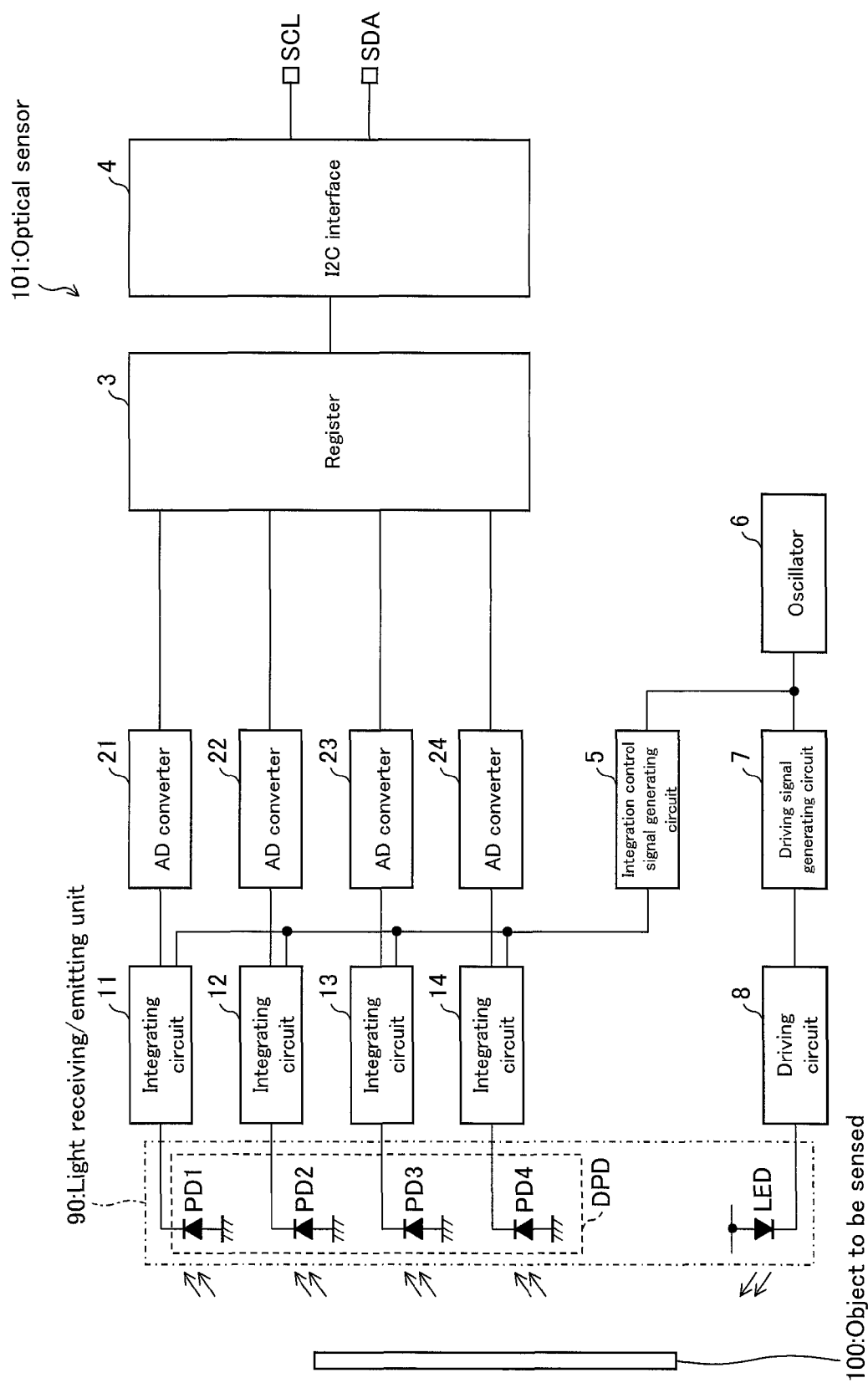
FIG. 1 is a block diagram illustrating a configuration of an optical sensor according to an embodiment of the invention.

FIG. 1 is a block diagram illustrating a configuration of an optical sensor 101 according to the present embodiment. The optical sensor 101 includes a plurality of integrating circuits 11 to 14 (integrating units), a plurality of AD converters 21 to 24, a register 3, an I2C interface 4, an integration control signal generating circuit 5, an oscillator 6, a driving signal generating circuit 7, a driving circuit 8, and a light receiving/emitting unit 90. The light receiving/emitting unit 90 includes a divided light-receiving element DPD and a light-emitting element LED. Here, the divided light-receiving element DPD is a light-receiving element whose light-receiving surface is divided into four, and includes four light-receiving elements PD1 to PD4.

The optical sensor 101 radiates light emitted by the light-emitting element LED onto an object to be sensed 100, and receives light reflected from the object to be sensed 100 by the plurality of light-receiving elements PD1 to PD4. The optical sensor 101 applies predetermined processing to photocurrents which have been subjected to photoelectric conversion in the light-receiving elements PD1 to PD4 and thereby detects the object to be sensed 100 in close proximity or a moving direction of the object to be sensed 100. Note that, the object to be sensed 100 may be, for example, a finger or a stylus with which a smartphone including the optical sensor 101 is operated.

(Configuration of Light Receiving/Emitting Unit)

Figure 2:
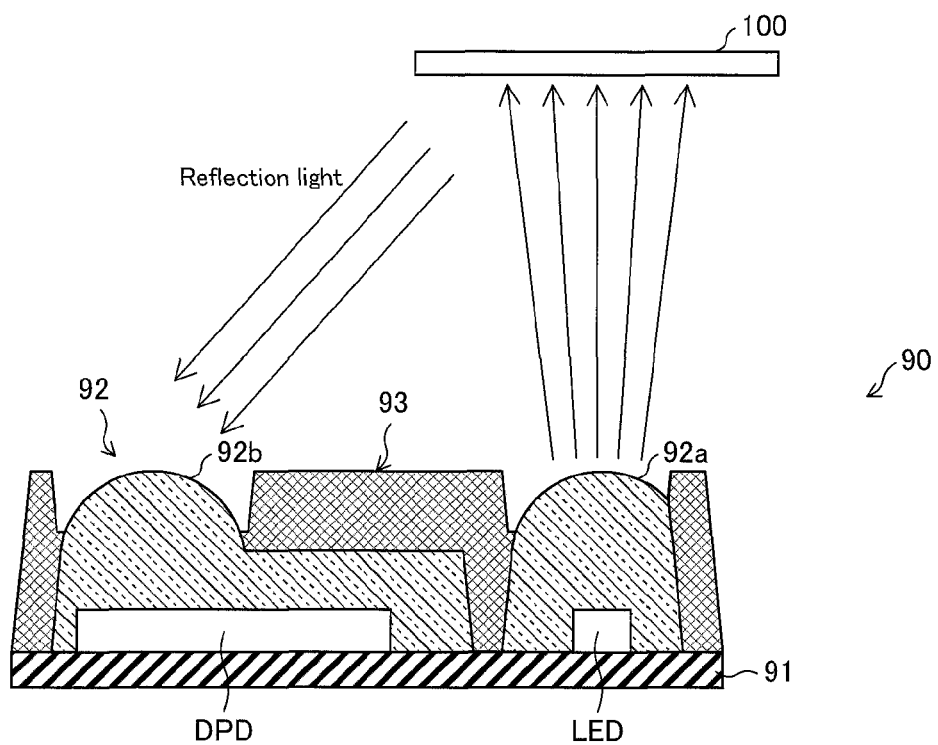
FIG. 2 is a vertical section view illustrating a configuration in a section of a light receiving/emitting unit of the optical sensor.

FIG. 2 is a vertical section view illustrating a section configuration of the light receiving/emitting unit 90. The light receiving/emitting unit includes the light-emitting element LED, the divided light-receiving element DPD, a substrate 91, a transparent resin portion 92, and a light shielding resin portion 93. Note that, directions of coordinate axes, which are indicated with X, Y, and Z, correspond to those of coordinate axes indicated in other figures.

The light-emitting element LED is mounted on the substrate 91 at a space from the divided light-receiving element DPD. Here, the light-emitting element LED is composed of a light-emitting diode (LED). However, there is no limitation to this configuration, and a light source other than the light-emitting diode may be used as the light-emitting element LED.

The divided light-receiving element DPD is composed of a photodiode, a phototransistor, or an optical IC. The optical IC is obtained by integrally forming the light-receiving element PD and a signal processing circuit and an LED driver circuit.

The transparent resin portion 92 is formed on the substrate 91 so as to cover the light-emitting element LED and the divided light-receiving element DPD. The transparent resin portion 92 is formed of a transparent resin material or a resin material for cutting visible light, which transmits an emission wavelength of the light-emitting element LED and cuts a visible light component. The transparent resin portion 92 has a light-emitting lens portion 92a and a light-receiving lens portion (convex portion having a lens-like shape) 92b on a surface thereof.

The light-emitting lens portion 92a is a convex lens which is formed so as to be hemispherical on a light-outputting side of the light-emitting element LED. The light-emitting lens portion 92a focuses light radiated from the light-emitting element LED to a predetermined position or converts the light into parallel light.

The light-receiving lens portion 92b is a convex lens which is formed so as to be hemispherical on a light-entering side of the divided light-receiving element DPD. The light-receiving lens portion 92b focuses light reflected from the object to be sensed 100 onto the divided light-receiving element DPD. Since light reflected by the object to be sensed 100 is collected by the light-receiving lens portion 92b, the optical sensor 101 is able to increase sensitivity for sensing a moving direction of the object to be sensed 100, which depends on a distance between the light receiving/emitting unit 90 and the object to be sensed 100.

Note that, without limitation to the above-described configuration, the light receiving/emitting unit 90 may not include the light-emitting lens portion 92a. However, by collecting light by the light-emitting lens portion 92a on a light-emitting element LED side, similarly to an effect of the light-receiving lens portion 92b, it is possible to increase sensitivity for sensing a moving direction of the object to be sensed 100, which depends on a distance between the light receiving/emitting unit 90 and the object to be sensed 100. Further, the optical sensor 101 is able to change a range (range which extends in a direction parallel to an XY plane of FIG. 2), in which sensing is able to be performed, by the light-emitting lens portion 92a.

The light shielding resin portion 93 covers a part of the transparent resin portion 92 excluding the light-emitting lens portion 92a and the light-receiving lens portion.

(Configuration of Integrating Circuit)

Figure 3:
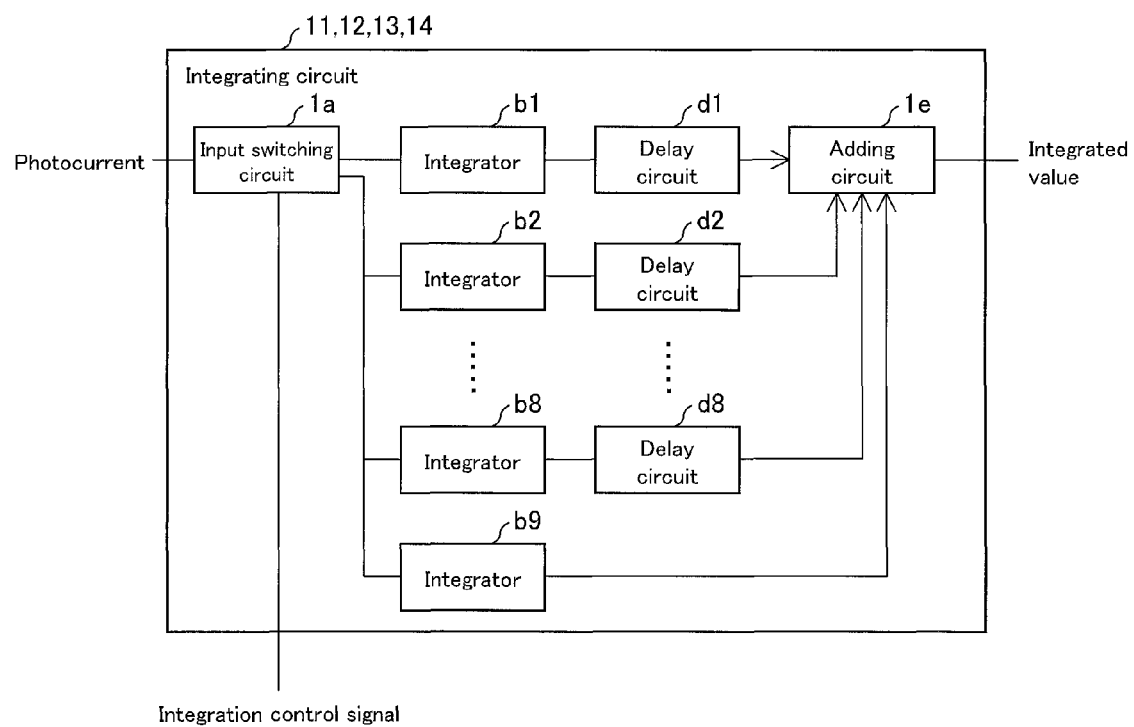
FIG. 3 is a block diagram illustrating a configuration of an integrating circuit in the optical sensor.

FIG. 3 is a block diagram illustrating a configuration of each of the integrating circuits 11 to 14 in the optical sensor 101. Since each of the integrating circuits 11 to 14 has the same configuration, description will be given below for the integrating circuit 11. The integrating circuit 11 has an input switching circuit 1a, a plurality of integrators b1 to b9, a plurality of delay circuits d1 to d8, and a adding circuit 1e. The plurality of integrators are provided in accordance with the number of periods for integration. The delay circuits are provided the number of which is smaller by one than the number of the plurality of integrators. Here, the number of integration periods for integration is nine, so that the integrating circuit 11 has nine integrators and eight delay circuits.

The integrators b1, b3, b5, b7, and b9 are circuits which integrate a photocurrent, which is input, in a negative direction (direction of a negative polarity). The integrators b2, b4, b6, and b8 are circuits which integrate a photocurrent, which is input, in a positive direction (direction of a positive polarity). The positive and the negative may be inverted.

The input switching circuit 1a is a circuit which, in order to input a photocurrent from the divided light-receiving element DPD to any one of the integrators b1 to b9, switches an input path to the integrator for each integration period. With an integration control signal given by the integration control signal generating circuit 5 described above, the input switching circuit 1a is controlled so as to switch the input of the photocurrent.

The integration control signal prescribes a plurality of integration periods during which integration is executed, and also prescribes an integration cycle which has a plurality of integration periods as one cycle.

The delay circuits d1 to d8 are circuits which delay integrated values respectively output from the corresponding integrators b1 to b8 until the last integration period ends.

The adding circuit 1e is a circuit which adds the respective integrated values output from the delay circuits d1 to d8 and the integrator b9. As an output of the integrating circuit 11, the adding circuit 1e outputs an added integrated value to outside.

In the integrating circuit 11 which is constituted as above, in a state where the input switching circuit 1a has switched the input path so that the photocurrent is input to the integrator b1, b3, b5, b7, or b9, the photocurrent is integrated in the negative direction by the integrator. Moreover, in a state where the input switching circuit 1a has switched the input path so that the photocurrent is input to the integrator b2, b4, b6, or b8, the photocurrent is integrated in the positive direction by the integrator. The plurality of delay circuits d1 to d8 have delay periods different from each other. The plurality of delay circuits d1 to d8 output the integrated values input from the corresponding integrators b1 to b8 to the adding circuit 1e at the same timing as that of the integrated value output from the integrator b9.

The integrated values output from the delay circuits d1 to d8 and the integrated value output from the integrator b9 are summed up by the adding circuit 1e. In this manner, the integrated values in the positive direction and the integrated values in the negative direction are summed up, and thus an integrated value of a difference in the integrated values in both the directions is able to be obtained.

(Modified Example of Integrating Circuit)

Figure 4:
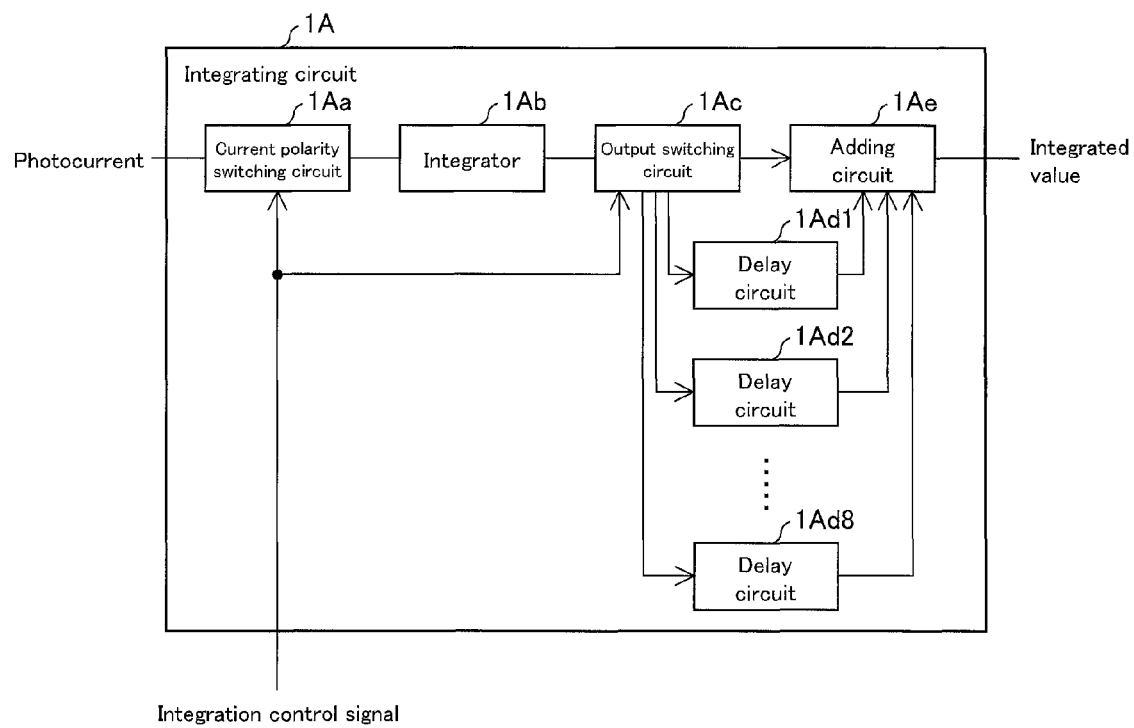
FIG. 4 is a block diagram illustrating a configuration of an integrating circuit in a modified example.

FIG. 4 is a block diagram illustrating a configuration of an integrating circuit 1A according to a modified example of the integrating circuit 11 illustrated in FIG. 3. As an integrating circuit of the optical sensor 101, the integrating circuit 1A as illustrated in FIG. 4 may be used. As illustrated in FIG. 4, the integrating circuit 1A has a current polarity switching circuit 1Aa, an integrator 1Ab, an output switching circuit 1Ac, delay circuits 1Ad1 to 1Ad8, and an adding circuit 1Ae. The delay circuits are provided the number of which is smaller by one than the number of integration periods for integration.

The current polarity switching circuit 1Aa is a circuit which switches a polarity of the photocurrent from the divided light-receiving element DPD for each integration period. With the integration control signal described above, the current polarity switching circuit 1Aa is controlled so as to switch the polarity of the photocurrent.

The integrator 1Ab is a circuit which integrates the photocurrent output from the current polarity switching circuit 1Aa.

The output switching circuit 1Ac is a circuit which switches an output path from the integrator for each integration period so that an integrated value output from the integrator 1Ab is output to any one of the delay circuits 1Ad1 to 1Ad8 and the adding circuit 1Ae. With the integration control signal, the output switching circuit 1Ac is controlled so as to switch the output path.

The delay circuits 1Ad1 to 1Ad8 are circuits which delay the integrated value output from the output switching circuit 1Ac until the last integration period ends.

The adding circuit 1Ae is a circuit which adds integrated values respectively output from the delay circuits 1Ad1 to 1Ad8 and the output switching circuit 1Ac. As an output of the integrating circuit 1A, the adding circuit 1Ae outputs an added integrated value to outside.

In the integrating circuit 1A which is constituted as above, when the photocurrent is output from the current polarity switching circuit 1Aa as a photocurrent having a negative (or positive) polarity, the photocurrent is integrated by the integrator 1Ab. The integrated value output from the integrator 1Ab is output to the adding circuit 1Ae through the output switching circuit 1Ac and any of the delay circuits 1Ad1 to 1Ad8. Alternatively, the integrated value output from the integrator 1Ab is output from the output switching circuit 1Ac to the adding circuit 1Ae through no delay circuit. The plurality of delay circuits 1Ad1 to 1Ad8 have delay periods different from each other. The plurality of delay circuits 1Ad1 to 1Ad8 output the integrated values input from the output switching circuit 1Ac to the adding circuit 1Ae at the same timing as that of the integrated value directly output from the output switching circuit 1Ac to the adding circuit 1Ae.

The integrated values output from the delay circuits 1Ad1 to 1Ad8 and the integrated value directly output from the output switching circuit 1Ac to the adding circuit 1Ae are summed up by the adding circuit 1e. In this manner, the integrated values in the positive direction and the integrated values in the negative direction are summed up, and thus an integrated value of a difference in the integrated values in both the directions is able to be obtained.

The integrating circuit 1A as above is able to output an integrated value equivalent to that of the integrating circuit 11 illustrated in FIG. 3. Moreover, differently from the integrating circuit 11 which has nine integrators b1 to b9, the integrating circuit 1A has one integrator 1Ab, so that it is possible to simplify a circuit configuration.

(Configurations of AD Converters, Register, and I2C Interface)

The AD converters 21 to 24 illustrated in FIG. 1 are circuits which convert integrated values output from the integrating circuits 11 to 14 into digital values, respectively. The AD converters 21 to 24 respectively convert the integrated values output from the integrating circuits 11 to 14 into digital integrated values which are digital, and output the resultants.

The register 3 stores the digital integrated values output from the AD converters 21 to 24. The digital integrated values stored in the register 3 are able to be taken out to outside by the I2C interface 4.

The I2C interface 4 is a circuit which outputs, as serial data SDA, the digital integrated value output from the register 3 in synchronization with a serial clock SCL from outside.

(Configurations of Oscillator and Integration Control Signal Generating Circuit)

The oscillator 6 is a circuit which generates a reference clock having a predetermined cycle.

Based on the reference clock from the oscillator 6, the integration control signal generating circuit 5 outputs an integration control signal which becomes at a high level (H) during each integration period when performing integration and becomes at a low level (L) during a non-integration period when not performing integration. The integration period which will be described below is configured as a period shorter than each of a first period T1 to a ninth period T9 described below, during which the light-emitting element LED is turned on or off.

(Configurations of Driving Signal Generating Circuit and Driving Circuit)

The driving signal generating circuit 7 is a circuit which generates a driving signal for driving the light-emitting element LED, based on the reference clock from the oscillator 6. The driving signal is a signal with which the light-emitting element LED is turned on or off in a cycle which has the first period T1 to the ninth period T9 as one unit. Each of the first period T1 to the ninth period T9 corresponds to an on-period or off-period of the light-emitting element LED.

The driving circuit 8 is a circuit which generates a driving current for driving the light-emitting element LED, based on the driving signal generated in the driving signal generating circuit 7. The driving current is a pulse current, and given to the light-emitting element LED as an optical pulse signal.

<Operation of Optical Sensor>

(Basic Operation)

The light-emitting element LED emits light in a predetermined cycle based on the optical pulse signal from the driving circuit 8, and outputs an infrared optical pulse.

When the object to be sensed 100 is not positioned at an optical path of light emitted from the light-emitting element LED, the light emitted from the light-emitting element LED advances as it is. Therefore, the divided light-receiving element DPD does not receive light reflected from the object to be sensed 100, and only ambient light is made incident thereon, so that an amount of incident light on the divided light-receiving element DPD is small. In this case, the object to be sensed 100 is not to be sensed.

When the object to be sensed 100 approaches the optical sensor 101 and reaches a position of the optical path of the light emitted from the light-emitting element LED, the light emitted from the light-emitting element LED is reflected by the object to be sensed 100. As the object to be sensed 100 approaches the optical sensor 101, an amount of light reflected from the object to be sensed 100 increases. Each of the light-receiving elements PD1 to PD4 of the divided light-receiving element DPD generates a photocurrent in proportion to an amount of incident light on the light-receiving element.

In the optical sensor 101, the photocurrents generated by the light-receiving elements PD1 to PD4 are integrated by the corresponding integrating circuits 11 to 14, respectively. Integrated values from the integrating circuits 11 to 14 are converted into digital integrated values by the AD converters 21 to 24. The digital integrated values which are stored in the register 3 and which correspond to the light-receiving elements PD1 to PD4, respectively, are detection signals which indicate whether or not the object to be sensed 100 is sensed in close proximity by each of the light-receiving elements PD1 to PD4. The serial data SDA based on the detection signals is output from the I2C interface 4 in synchronization with the serial clock SCL from outside.

In the case of being used as a proximity sensor, the optical sensor 101 outputs a detection signal which indicates that the object to be sensed 100 comes into proximity when the object to be sensed 100 comes close thereto. On the other hand, in the case of being used as a gesture sensor, the optical sensor 101 senses a movement of the object to be sensed 100.

Comparative Example 1

As an example for comparison, description will be given for an operation of an optical sensor which performs integration in the positive direction and the negative direction during eight integration periods INT1 to INT8 which have the same length.

Figure 5:
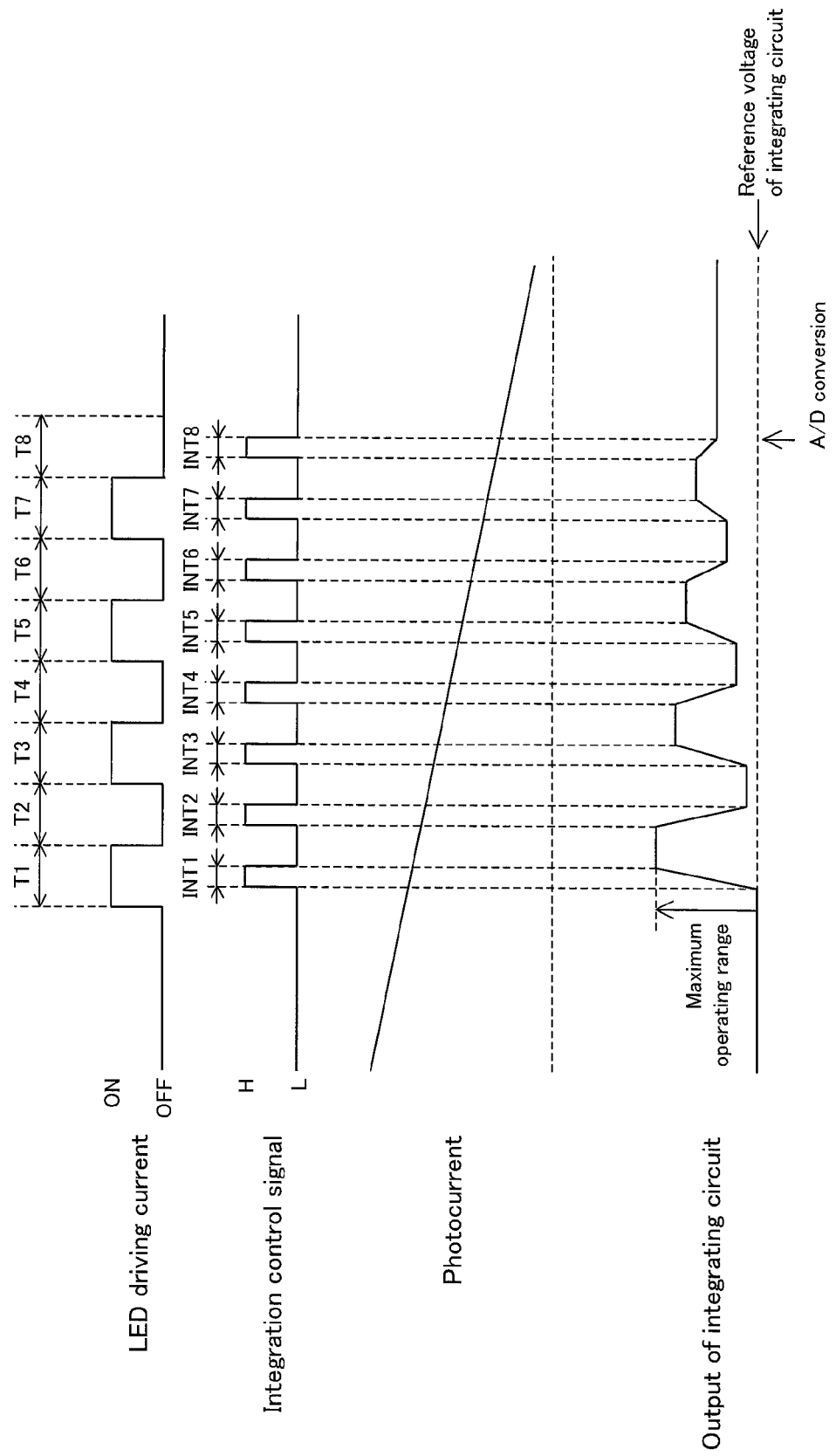
FIG. 5 is a timing chart illustrating an operation of an optical sensor of a comparative example in a case where disturbance light decreases at a constant rate.

FIG. 5 is a timing chart illustrating an operation of the optical sensor of a comparative example 1 in a case where disturbance light decreases at a constant rate. The light-emitting element LED repeats turning on (ON) and turning off (OFF) alternately for each of periods from a first period T1 to an eighth period T8 in accordance with a driving current which is supplied. The light-emitting element LED is to be ON during the first period T1, the third period T3, the fifth period T5, and the seventh period T7, and to be OFF during the second period T2, the fourth period T4, the sixth period T6, and the eighth period T8.

The integrating circuit performs integration of a photocurrent in each of the eight integration periods INT1 to INT8 in accordance with an integration control signal. Here, the integrating circuit performs integration in the positive direction for the integration periods INT1, INT3, INT5, and INT7, which are at odd-numbered times, and performs integration in the negative direction for the integration periods INT2, INT4, INT6, and INT8, which are at even-numbered times. That is, the integrating circuit performs integration in the positive direction in the integration periods during which the light-emitting element LED emits light, and performs integration in the negative direction in the integration periods during which the light-emitting element LED does not emit light.

For example, in a case where there is no object to be sensed 100 and disturbance light is constant, a photocurrent output by the light-receiving element FD is constant in the first period T1 to the eighth period T8. Thus, integrated values in the respective integration periods INT1 to INT8 are the same values. As a result thereof, the integrated values in the positive direction and the negative direction are offset by being summed up, and the integrating circuit outputs 0 (which is equal to a reference voltage of the integrating circuit) as an integrated value obtained by adding. That is, the integrated values of the photocurrent due to the constant disturbance light are offset.

Note that, in a case where the object to be sensed 100 exists near the light receiving/emitting unit 90, light emitted from the light-emitting element LED is reflected by the object to be sensed 100, so that a photocurrent increases in the period during which the light-emitting element LED is ON. As a result thereof, the integrating circuit outputs a value larger than 0 as the added integrated value. After the integration period INT8 which is the last, the integrated value output by the integrating circuit is converted into a digital integrated value by the AD converter. The optical sensor is able to judge that, when the integrated value output by the integrating circuit is equal to or more than a certain threshold, the object to be sensed 100 is in close proximity.

(When Disturbance Light Changes at Constant Rate)

Next, a case where there is no object to be sensed 100 and disturbance light decreases at a constant rate will be described with reference to FIG. 5. According to a fluctuation of the disturbance light, a photocurrent decreases at a constant rate in the first period T1 to the eighth period T8.

The integrating circuit performs integration in the positive direction in the integration period INT1, and performs integration in the negative direction in the subsequent integration period INT2. The photocurrent is smaller in the integration period INT2 than in the integration period INT1. Therefore, a sum of the integrated values of the integration period INT1 and the integration period INT2 becomes larger than 0. Similarly, in the integration periods INT3 to INT8, absolute values of the integrated values at odd-numbered times respectively become larger than absolute values of the integrated values of the subsequent integration periods at even-numbered times, so that it is not possible to offset the integrated values of the photocurrent due to the disturbance light which fluctuates.

As a result thereof, although there is no object to be sensed 100, the integrating circuit outputs an integrated value larger than 0. Accordingly, there is a possibility that, due to the disturbance light which fluctuates, the optical sensor erroneously detects that the object to be sensed 100 exists.

(When Disturbance Light Changes Periodically)

Figure 6:
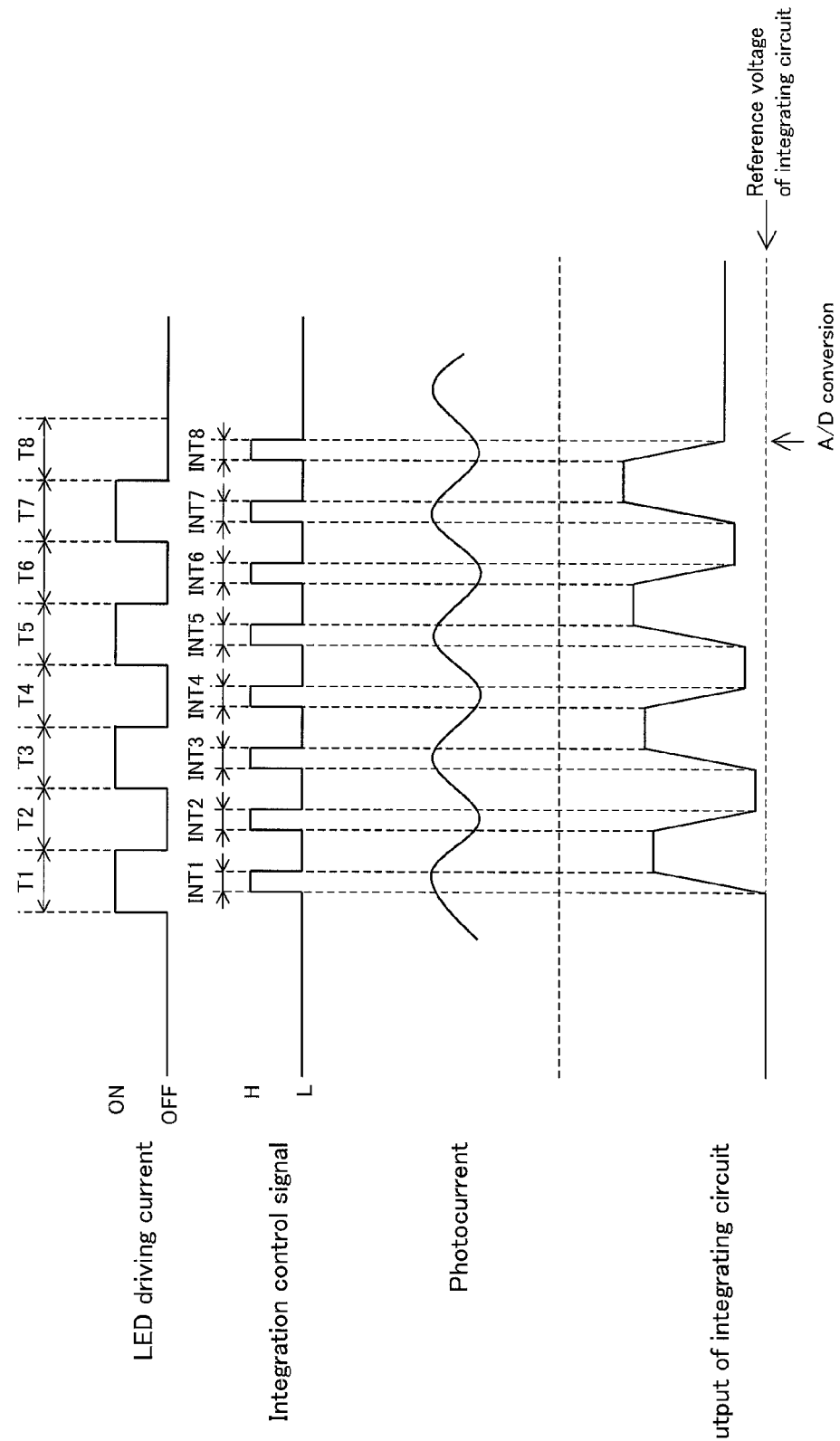
FIG. 6 is a timing chart illustrating an operation of the optical sensor of the comparative example in a case where disturbance light changes periodically.

Next, a case where there is no object to be sensed 100 and disturbance light changes periodically will be described with reference to FIG. 6. FIG. 6 is a timing chart illustrating an operation of the optical sensor of the comparative example 1 in a case where disturbance light changes periodically. The timings of ON/OFF of the light-emitting element and the timing of integration are the same as those of the case illustrated in FIG. 5. According to a fluctuation of the disturbance light, a photocurrent changes periodically in the first period T1 to the eighth period T8. Here, considered is a case where a fluctuation frequency of the disturbance light matches with a frequency of ON/OFF of the light-emitting element LED as illustrated in FIG. 6. That is, the fluctuation frequency of the disturbance light matches with a frequency of integration in the positive direction. The disturbance light (or photocurrent) is great in the integration periods at odd-numbered times and small in the integration periods at even-numbered times.

The integrating circuit performs integration in the positive direction in the integration period INT1, and performs integration in the negative direction in the subsequent integration period INT2. The photocurrent is smaller in the integration period INT2 than in the integration period INT1. Accordingly, a sum of integrated values of the integration period INT1 and the integration period INT2 becomes larger than 0. Similarly, in the integration periods INT3 to INT8, absolute values of the integrated values at odd-numbered times respectively become larger than absolute values of the integrated values of the subsequent integration periods at even-numbered times, so that it is not possible to offset the integrated values of the photocurrent due to the disturbance light which fluctuates.

As a result thereof, although there is no object to be sensed 100, the integrating circuit outputs an integrated value larger than 0. Accordingly, there is a possibility that, due to the disturbance light which fluctuates, the optical sensor erroneously detects that the object to be sensed 100 exists.

Comparative Example 2

A comparative example 2 in which a light-emitting timing of the light-emitting element LED is different from that of the comparative example 1 will be described below. By setting an OFF-period, an ON-period, an ON-period, and an OFF-period (T1 to T4) as one cycle as to the light-emitting timing of the light-emitting element LED as illustrated in FIG. 7, it is possible to offset an influence of disturbance light which decreases at a constant rate.

Figure 7:
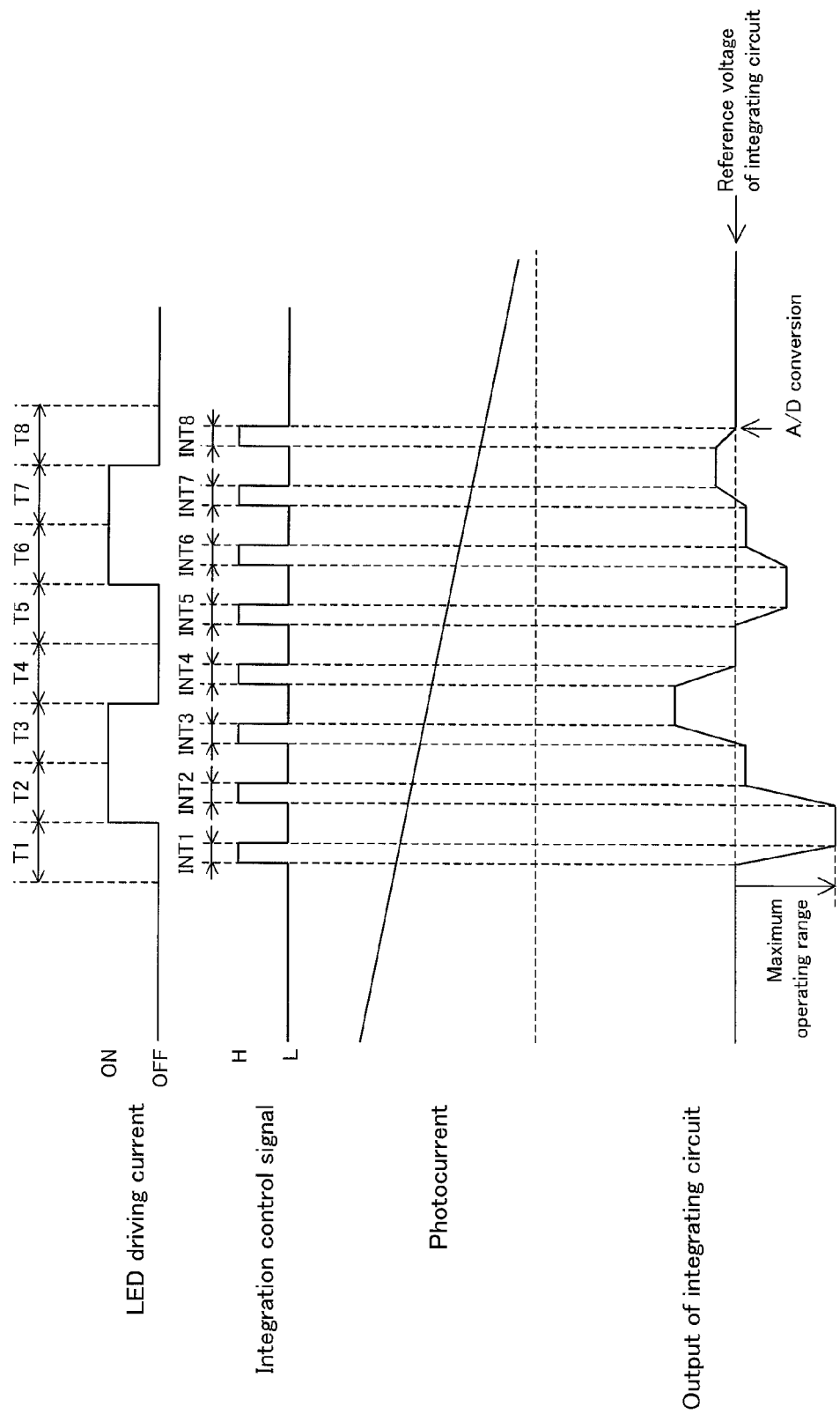
FIG. 7 is a timing chart illustrating an operation of an optical sensor of a different comparative example in a case where disturbance light decreases at a constant rate.

FIG. 7 is a timing chart illustrating an operation of an optical sensor of the comparative example 2 in a case where disturbance light decreases at a constant rate. The light-emitting element LED repeats the cycle of the OFF-period, the ON-period, the ON-period, and the OFF-period in the periods from the first period T1 to the eighth period T8 in accordance with a driving current which is supplied. The light-emitting element LED is to be ON during the second period T2, the third period T3, the sixth period T6, and the seventh period T7, and to be OFF during the first period T1, the fourth period T4, the fifth period T5, and the eighth period T8.

Here, the integrating circuit performs integration in the positive direction for the integration periods INT2, INT3, INT6, and INT7, and performs integration in the negative direction for the integration periods INT1, INT4, INT5, and INT8. That is, the integrating circuit performs integration in the positive direction in the integration periods during which the light-emitting element LED emits light, and performs integration in the negative direction in the integration periods during which the light-emitting element LED does not emit light.

(When Disturbance Light Changes at Constant Rate)

A case where there is no object to be sensed 100 and disturbance light decreases at a constant rate will be described with reference to FIG. 7. According to a fluctuation of the disturbance light, a photocurrent decreases at a constant rate in the first period T1 to the eighth period T8.

The integrating circuit performs integration in the negative direction in the integration period INT1, and performs integration in the positive direction in the subsequent integration period INT2. The photocurrent is smaller in the integration period INT2 than in the integration period INT1. Therefore, a sum of the integrated values of the integration period INT1 and the integration period INT2 becomes smaller than 0. Subsequently, integration in the positive direction is performed in the integration period INT3, and integration in the negative direction is performed in the subsequent integration period INT4. The photocurrent is smaller in the integration period INT4 than in the integration period INT3. Therefore, a sum of the integrated values of the integration period INT3 and the integration period INT4 becomes larger than 0.

Since the disturbance light decreases linearly, a difference in the photocurrent between the integration period INT1 and the integration period INT2 and a difference in the photocurrent between the integration period INT3 and the integration period INT4 are the same. Then, the directions for performing integration are opposite between the integration period INT1 and the integration period INT2 and are opposite between the integration period INT3 and the integration period INT4. Thus, the sum of the integrated values of the integration period INT1 and the integration period INT2 and the sum of the integrated values of the integration period INT3 and the integration period INT4 are offset by each other. Accordingly, a sum of the integrated values of the integration periods INT1 to INT4 becomes 0. Similarly, a sum of integrated values of the integration periods INT5 to INT8 becomes 0.

As a result thereof, the integrating circuit is able to output 0, which indicates that there is no object to be sensed 100, as an integrated value. In this manner, by changing timings of ON/OFF of the light-emitting element LED without performing a complicated signal operation, it is possible to offset an influence of the disturbance light which fluctuates at a constant rate. It is the same also in a case where disturbance light increases linearly.

(When Disturbance Light Changes Periodically)

Figure 8:
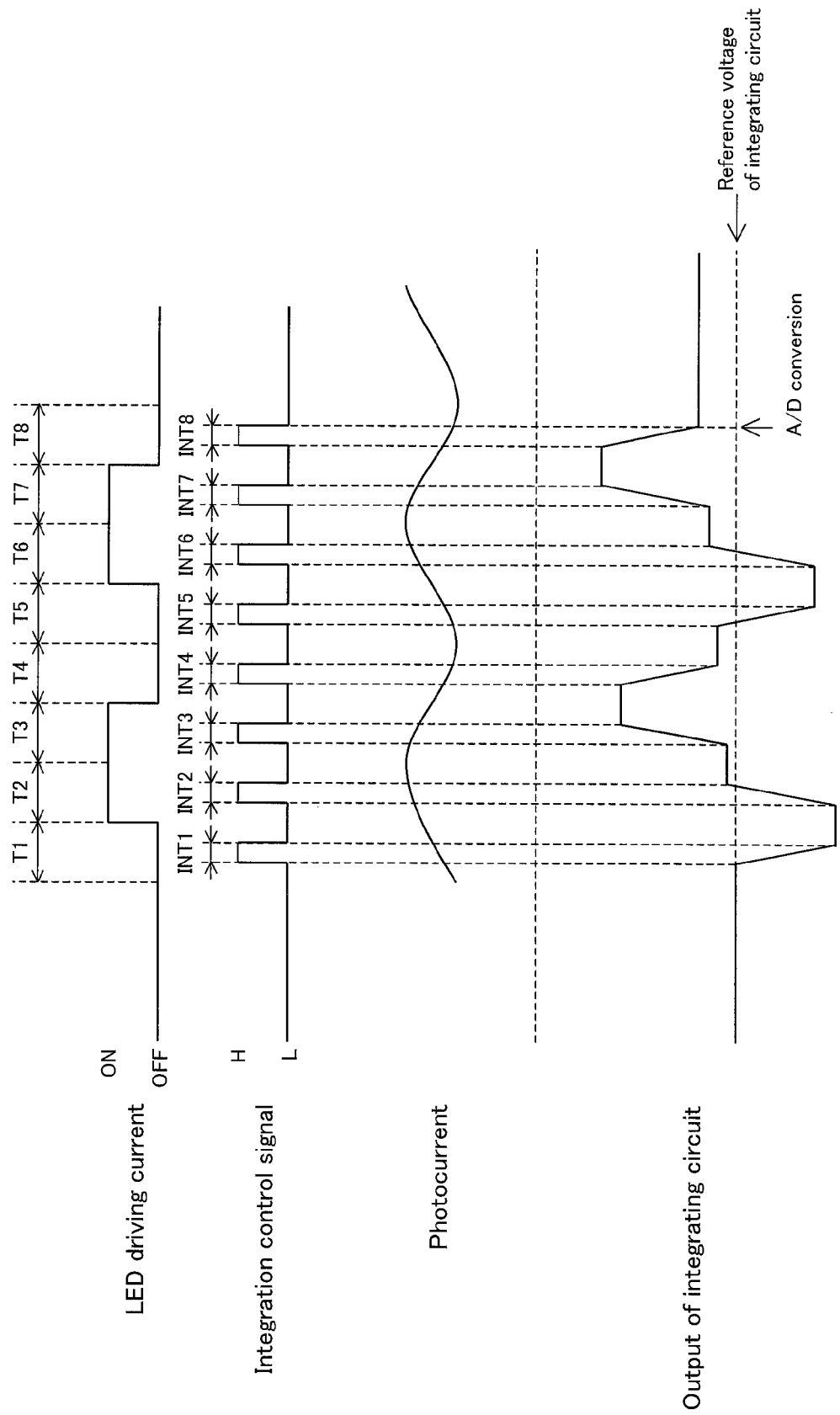
FIG. 8 is a timing chart illustrating an operation of the optical sensor of the different comparative example in a case where disturbance light changes periodically.

However, also in the comparative example 2, there is a case where the object to be sensed 100 is erroneously detected when disturbance light changes periodically. A case where there is no object to be sensed 100 and the disturbance light changes periodically will be described with reference to FIG. 8. FIG. 8 is a timing chart illustrating an operation of the optical sensor of the comparative example 2 in a case where the disturbance light changes periodically. The timings of ON/OFF of the light-emitting element and the timing of integration are the same as those of the case illustrated in FIG. 7. A photocurrent changes periodically in the first period T1 to the eighth period T8 according to a fluctuation of the disturbance light. Here, considered is a case where a fluctuation frequency of the disturbance light matches with a frequency of ON/OFF of the light-emitting element LED as illustrated in FIG. 8. That is, the fluctuation frequency of the disturbance light matches with a frequency of integration in the positive direction. The disturbance light (and the photocurrent) is great in the ON-period of the light-emitting element LED and small in the OFF-period of the light-emitting element LED.

The integrating circuit performs integration in the negative direction in the integration period INT1, and performs integration in the positive direction in the subsequent integration period INT2. The photocurrent is larger in the integration period INT2 than in the integration period INT1. Therefore, a sum of the integrated values of the integration period INT1 and the integration period INT2 becomes larger than 0. Subsequently, integration in the positive direction is performed in the integration period INT3, and integration in the negative direction is performed in the subsequent integration period INT4. The photocurrent is smaller in the integration period INT4 than in the integration period INT3. Therefore, a sum of the integrated values of the integration period INT3 and the integration period INT4 becomes larger than 0. It is also similar in the integration periods INT5 to INT8.

The photocurrent in the integration periods during which integration is performed in the positive direction is always larger than the photocurrent in the integration periods during which integration is performed in the negative direction, so that the integrating circuit is not able to offset the integrated values of the photocurrent due to the disturbance light which fluctuates.

As a result thereof, although there is no object to be sensed 100, the integrating circuit outputs an integrated value larger than 0. Accordingly, there is a possibility that, due to the disturbance light which fluctuates periodically, the optical sensor erroneously detects that the object to be sensed 100 exists.

As a light source of such disturbance light which fluctuates with a high frequency, an inverter fluorescent lamp or the like which operates with a frequency of a several tens of kHz may be considered. The optical sensor of the comparative example 2 is resistant to disturbance light which changes linearly, but, instead, performs erroneous detection due to disturbance light which fluctuates with a frequency lower than (half of) that of the comparative example 1.

<Example of Operation of Present Embodiment>

An example of operation of the optical sensor 101 of the present embodiment will be described below.

Figure 9:
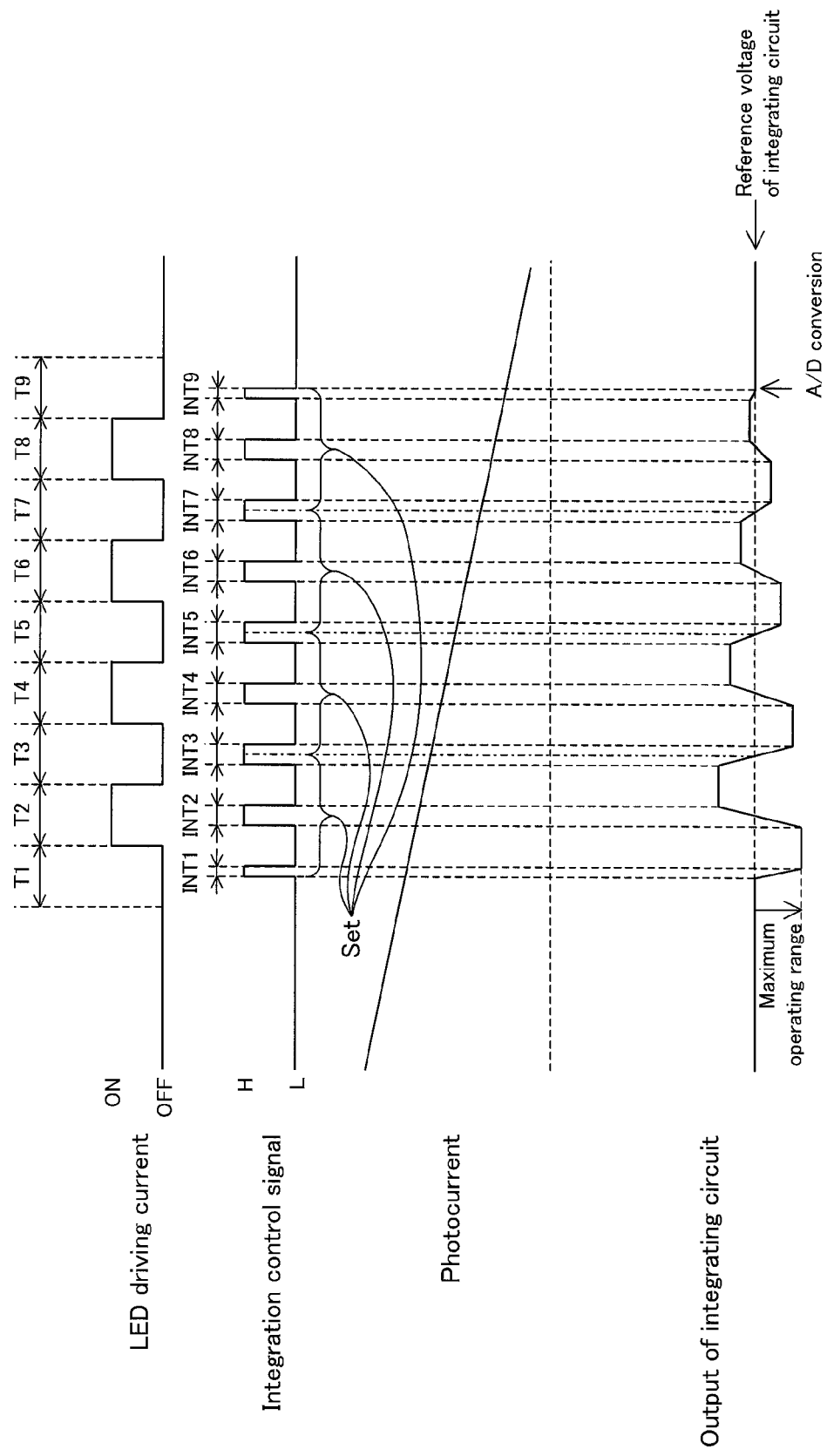
FIG. 9 is a timing chart illustrating an operation of the optical sensor of the aforementioned embodiment in a case where disturbance light decreases at a constant rate.

FIG. 9 is a timing chart illustrating an operation of the optical sensor 101 of the present embodiment in a case where disturbance light decreases at a constant rate. The first period T1 to the ninth period T9, which are continuous, are regarded as one period group. The AD converter 21 converts an integrated value obtained by adding in one period group into a digital integrated value. The light-emitting element LED repeats turning off (OFF) and turning on (ON) alternately for each of the periods from the first period T1 to the ninth period T9 in accordance with a driving current which is supplied. The light-emitting element LED is to be OFF during the first period T1, the third period T3, the fifth period T5, the seventh period T7, and the ninth period T9, which are at odd-numbered times, and to be ON during the second period T2, the fourth period T4, the sixth period T6, and the eighth period T8, which are at even-numbered times. Each of the first period T1 to the ninth period T9 has the same length.

Note that, light emitted from the light-emitting element LED only needs to be darker during a turn-off period than a turn-on period, and may not turn off completely during the turn-off period.

The integrating circuit performs integration of a photocurrent in each of nine integration periods INT1 to INT9 in accordance with an integration control signal. One integration period is shorter than one ON-period (or OFF-period). The integration periods INT1 to INT9 are included in the corresponding periods of the first period T1 to the ninth period T9, respectively. Here, the integrating circuit performs integration in the negative direction (second polarity direction) for the integration periods INT1, INT3, INT5, INT7, and INT9, which are at odd-numbered times, and performs integration in the positive direction (first polarity direction) for the integration periods INT2, INT4, INT6, and INT8, which are at even-numbered times. That is, the integrating circuit performs integration in the positive direction in the integration periods during which the light-emitting element LED emits light and performs integration in the negative direction in the integration periods during which the light-emitting element LED does not emit light.

Further, each length of the first integration period INT1 and the last integration period INT9 is half the length of other integration periods. Each length of the other integration periods INT2 to INT8 is the same. In addition, intervals between the respective integration periods INT1 to INT9 (lengths of periods during which integration is not performed) are the same.

For example, in a case where there is no object to be sensed 100 and disturbance light is constant, a photocurrent output by the light-receiving element PD is constant in the first period T1 to the ninth period T9. Thus, integrated values in the respective integration periods INT2 to INT8 become the same. Moreover, integrated values in the integration periods INT1 and INT9, whose length is the half, become a half value of that of another one of the integration periods INT2 to INT8. As a result thereof, the integration values in the positive direction and the negative direction are offset by being summed up, and the integrating circuit 11 outputs 0 (which is equal to the reference voltage of the integrating circuit) as an integrated value obtained by adding. That is, the integrated values of the photocurrent due to the disturbance light which is constant are offset.

Note that, in a case where the object to be sensed 100 exists near the light receiving/emitting unit 90, light emitted from the light-emitting element LED is reflected by the object to be sensed 100, so that the photocurrent increases in the period during which the light-emitting element LED is ON. As a result thereof, the integrating circuit 11 outputs a value larger than 0 as the integrated value obtained by adding. After the integration period INT9 which is the last, the integrated value output by the integrating circuit is converted into a digital integrated value by the AD converter 21. The optical sensor 101 is able to judge that, when the integrated value output by the integrating circuit 11 is equal to or more than a certain threshold, the object to be sensed 100 is in close proximity.

(When Disturbance Light Changes at a Constant Rate)

Next, a case where there is no object to be sensed 100 and disturbance light decreases at a constant rate will be described with reference to FIG. 9. A photocurrent indicated in FIG. 9 is caused due to the disturbance light. According to a fluctuation of the disturbance light, the photocurrent decreases at a constant rate in the first period T1 to the ninth period T9.

The integrating circuit 11 performs integration in the negative direction in the integration period INT1 whose time width is a half. Subsequently, the integrating circuit 11 performs integration in the positive direction and integration in the negative direction alternately in the integration periods INT2 to INT8. Lastly, the integrating circuit 11 performs integration in the negative direction in the integration period INT9 whose time width is the half.

Here, by setting the integration period whose time width is the half (INT1) as a unit, one set of integration in the negative direction, integration in the positive direction, integration in the positive direction, and integration in the negative direction is performed from the integration period INT1 to the middle of the integration period INT3. A difference of an absolute value of the integrated value of the integration period INT1 and an absolute value of an integrated value of a first half of the integration period INT2 is the same as a difference of an absolute value of an integrated value of a last half of the integration period INT2 and an absolute value of an integrated value of a first half of the integration period INT3. Thus, an added integrated value becomes 0 at a time point when the first half of the integration period INT3 ends. The set of integration in the negative direction, integration in the positive direction, integration in the positive direction, and integration in the negative direction, which has the integration period whose time width is the half as the unit, is repeated between the integration period INT1 and the integration period INT9. Integrated values of the disturbance light which decreases at the constant rate are offset in each set, so that the integrating circuit 11 finally outputs 0 as the integrated value obtained by adding. It is the same also in a case where disturbance light increases linearly. That is, integrated values of a photocurrent due to disturbance light which changes linearly are offset.

Moreover, in the optical sensor 101 of the present embodiment, the integrating circuit 11 first performs integration in the negative direction in the integration period INT1 whose time width is the half, and then performs integration in an opposite direction alternately. Accordingly, an integrated value output by the integrating circuit 11 changes upward and downward with respect to a reference voltage of an integrator. This makes it possible to reduce a maximum operating range of the integrating circuit 11 in the positive direction or the negative direction when light with certain intensity enters the light-receiving element PD compared to the comparative examples 1 and 2. That is, an operating range that the integrating circuit 11 is able to use is increased. Thus, even when intense disturbance light such as sunlight enters, the integrated value (voltage) of the integrating circuit 11 is less likely to be saturated in the integrating circuit 11. That is, in the present embodiment, it is possible to increase saturation illuminance of disturbance light to be about twice as compared to the comparative examples 1 and 2.

Note that, disturbance light by an illuminating appliance which operates with a commercial power supply having a frequency of 50 Hz to 60 Hz changes brightness with a frequency from 100 Hz to 120 Hz which is a twice thereof. Such disturbance light of the illuminating appliance may be regarded as disturbance light, which changes linearly, by the optical sensor 101. This is because periods during which the optical sensor 101 performs a detection operation (periods from INT1 to INT9) are sufficiently short as compared to a cycle of brightness of such an illuminating appliance. In addition, in a case where, when constant disturbance light (for example, sunlight) exists, an amount of disturbance light blocked by a moving object to be sensed 100 changes, it is possible to regard such disturbance light as disturbance light which changes linearly.

(Summary of Operation)

In the above-described example of the operation, a case where nine integration periods are provided has been described, but the invention is not limited thereto. The optical sensor 101 of the present embodiment is able to have a configuration in which, when n is a natural number, integration is performed 2n+1 times in the first period to a (2n+1)th period, which are continuous. In the example of the operation illustrated in FIG. 9, n represents 4, and the ninth period T9 corresponds to the (2n+1)th period.

In the respective periods from the first period to the (2n+1)th period, the light-emitting element LED is turned OFF/ON alternately. In accordance with OFF/ON of the light-emitting element LED, integration in the negative direction/positive direction is performed alternately in the respective periods from the first period to the (2n+1)th period. However, in each of the first period, which is first, and the (2n+1)th period, which is last, a length of the integration period during which integration is performed is a predetermined length p. On the other hand, in each of a second period to a 2n-th period, which are between the first period and the last period, each length of the integration periods is twice of p.

(When Disturbance Light Changes Periodically)

The optical sensor 101 of the present embodiment is able to offset also an influence due to the disturbance light which changes with the frequency indicated in FIG. 8, which changes periodically. The disturbance light indicated in FIG. 8 sets four periods (the first period T1 to the fourth period T4) as one cycle. In the optical sensor 101 (refer to FIG. 9), the four periods (one cycle of the disturbance light) includes two of the integration periods in the positive direction and two of the integration periods in the negative direction alternately. The optical sensor 101 is therefore able to offset the influence due to the disturbance light which changes with the frequency indicated in FIG. 8.

An example of the disturbance light which changes periodically in this manner includes disturbance light by an inverter fluorescent lamp or the like, which operates with a frequency of a several tens of kHz.

However, when a fluctuation frequency of the disturbance light further becomes great, there are some cases where an influence due to the disturbance light becomes unable to be offset. A case where there is no object to be sensed 100 and disturbance light changes periodically with a high frequency will be described with reference to FIG. 10.

Figure 10:
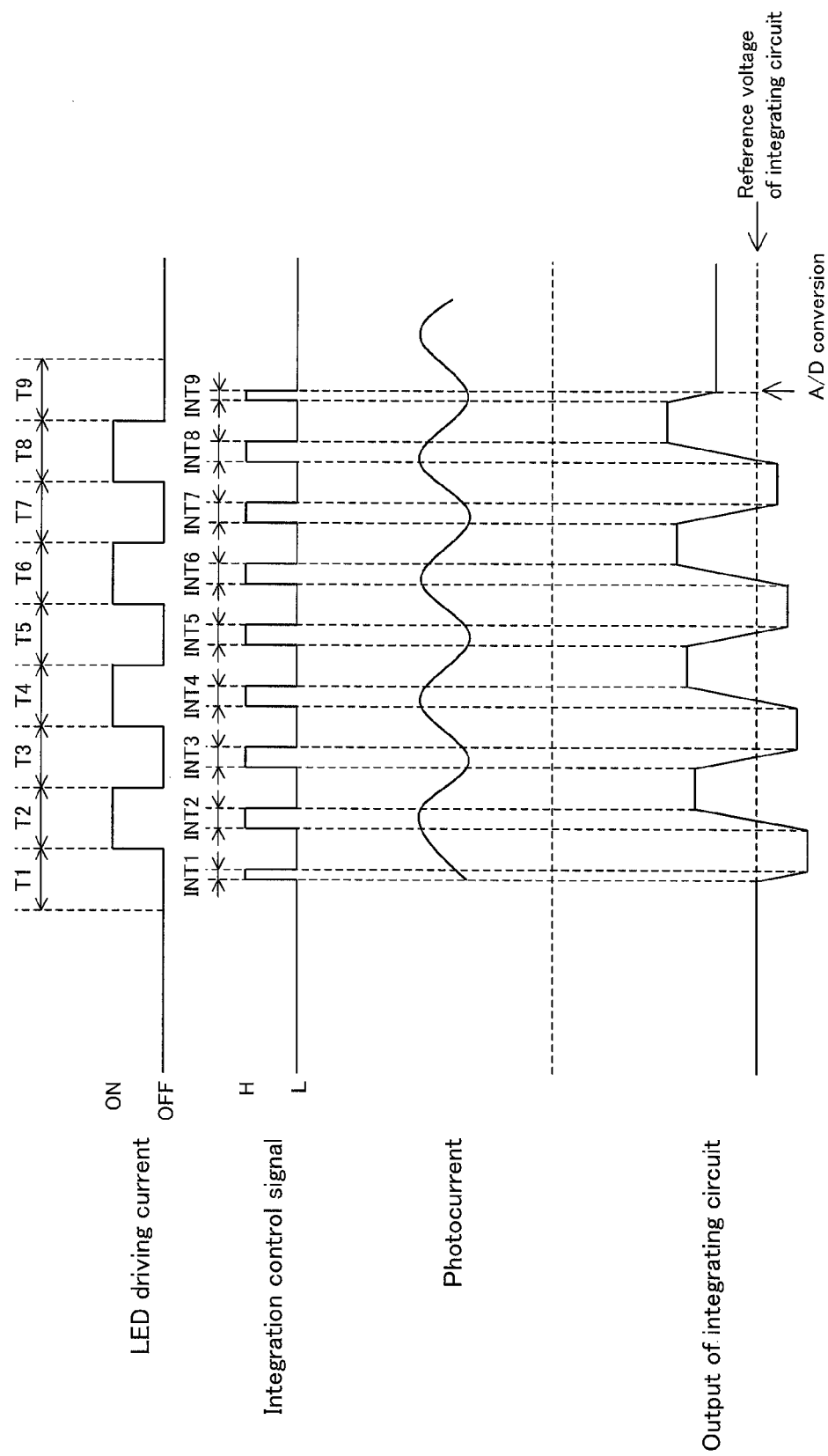
FIG. 10 is a timing chart illustrating an operation of the optical sensor of the aforementioned embodiment in a case where disturbance light changes periodically.

FIG. 10 is a timing chart illustrating an operation of the optical sensor 101 of the present embodiment in a case where disturbance light changes periodically. The timings of ON/OFF of the light-emitting element and the timing of integration are the same as those of the case illustrated in FIG. 9. A photocurrent indicated in FIG. 10 is caused due to disturbance light. According to a fluctuation of the disturbance light, the photocurrent changes periodically in the first period T1 to the ninth period T9. Here, considered is a case where a fluctuation frequency of the disturbance light matches with a frequency of ON/OFF of the light-emitting element LED as illustrated in FIG. 10. The fluctuation frequency of the disturbance light, which is illustrated in FIG. 10, is twice the fluctuation frequency of the disturbance light, which is illustrated in FIG. 8. At this time, the fluctuation frequency of the disturbance light matches with a frequency of integration in the positive direction. The disturbance light (and the photocurrent) is great in the ON-period of the light-emitting element LED and small in the OFF-period of the light-emitting element LED.

The photocurrent in the integration periods during which integration is performed in the positive direction (INT2, INT4, INT6, and INT8) is always larger than the photocurrent in the integration periods during which integration is performed in the negative direction (INT1, INT3, INT5, INT7, and INT9). Thus, at a time point when the integration period INT9 ends, a difference of integrated values remains. Accordingly, the integrating circuit 11 is not able to offset integrated values of the photocurrent due to the disturbance light which fluctuates with a high frequency (frequency of ON/OFF of the light-emitting element LED).

However, as described above, the optical sensor 101 of the present embodiment is able to offset an influence of disturbance light (disturbance light with the cycle illustrated in FIG. 8) which fluctuates periodically with a period, which includes four integration periods (for example, from the second period T2 to the fifth period T5), as one cycle.

Contrary to this, in the comparative example 2, an influence of disturbance light which fluctuates periodically with a period, which includes four periods, as one cycle is unable to be offset. Note that, when each of the integration periods and light-emitting periods is shortened in the comparative example 2, an integration frequency becomes high, but, since the integration periods become short, signal intensity (integrated value obtained by adding) which is obtained due to the object to be sensed 100 is also reduced. In order to keep the signal intensity which is able to be obtained, it is necessary to increase the number of times of integration, but a period for a detection operation and current consumption increase.

In the present embodiment, compared to the comparative examples, while a period of a detection operation is substantially the same, it is possible to double an integration frequency (that is, a frequency of ON/OFF of the light-emitting element LED) in the positive direction (or negative direction). Here, the period of a detection operation means a period from a start of the first integration to an end of the last integration. Accordingly, compared to the comparative examples, the optical sensor 101 of the present embodiment is able to prevent erroneous detection due to disturbance light with a frequency which is about twice. Thus, compared to the comparative examples, the optical sensor 101 of the present embodiment is advantageous in terms of increasing the integration frequency in order to avoid an operation frequency of several tens of kHz as that of an inverter fluorescent lamp.

(Modified Example of Operation)

Note that, though a case where the light-emitting element LED is OFF in the first integration period INT1 and the last integration period INT9 has been described above, the light-emitting element LED may be ON in the first integration period INT1 and the last integration period INT9. In this case, the light-emitting element LED is to be OFF in the integration periods INT2, INT4, INT6, and INT8, and the light-emitting element LED is to be ON in the integration periods INT3, INT5, INT7, and INT9.

Integration in the positive direction and integration in the negative direction in the respective integration periods may be inverted. In this case, a polarity of an integrated value output by the integrating circuit 11 is merely inverted.

In addition, the first integration period INT1 and the last integration period INT9 may not be equal. In order to obtain a correct signal (integrated value obtained by adding), a sum of the respective integration periods in the positive direction and a sum of the respective integration periods in the negative directions are required to be the same. Note that, from the integration period INT1 to the integration period INT9, the positive and negative directions of integration are required to be alternate. Then, a sum of the first integration period INT1 and the last integration period INT9 only needs to be equal to other integration periods (such as INT2). For example, a length of the first integration period INT1 may be ¼ of that of another integration period (such as INT2), and a length of the last integration period INT9 may be ¾ of that of the other integration period (such as INT2). Also in this case, it is possible to reduce an influence of disturbance light, which changes linearly, compared to the comparative example 1. When the first integration period INT1 and the last integration period INT9 are shorter than the other integration period (such as INT2), it is possible to reduce the influence of the disturbance light compared to the comparative example 1. Here, when the first integration period INT1 and the last integration period INT9 are half the other integration period (such as INT2), positive and negative integration periods become most symmetrical, so that an effect of reducing the influence of the disturbance light is enhanced.

<Sensing of Moving Direction of Object to be Sensed>

Figure 11:
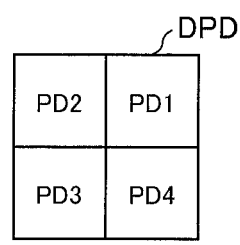
FIG. 11 is a plan view illustrating a plane configuration of a divided light-receiving element of the aforementioned optical sensor.

FIG. 11 is a plan view illustrating a plane configuration of the divided light-receiving element DPD. A region of the divided light-receiving element DPD, on which light reflected from the object to be sensed 100 is incident, is divided into four in a plane, and light-receiving elements (PD1, PD2, PD3, and PD4) are disposed in the respective divided regions. The optical sensor 101 then uses the light-receiving elements PD1 to PD4 for sensing a moving direction of the object to be sensed 100.

Figure 12:
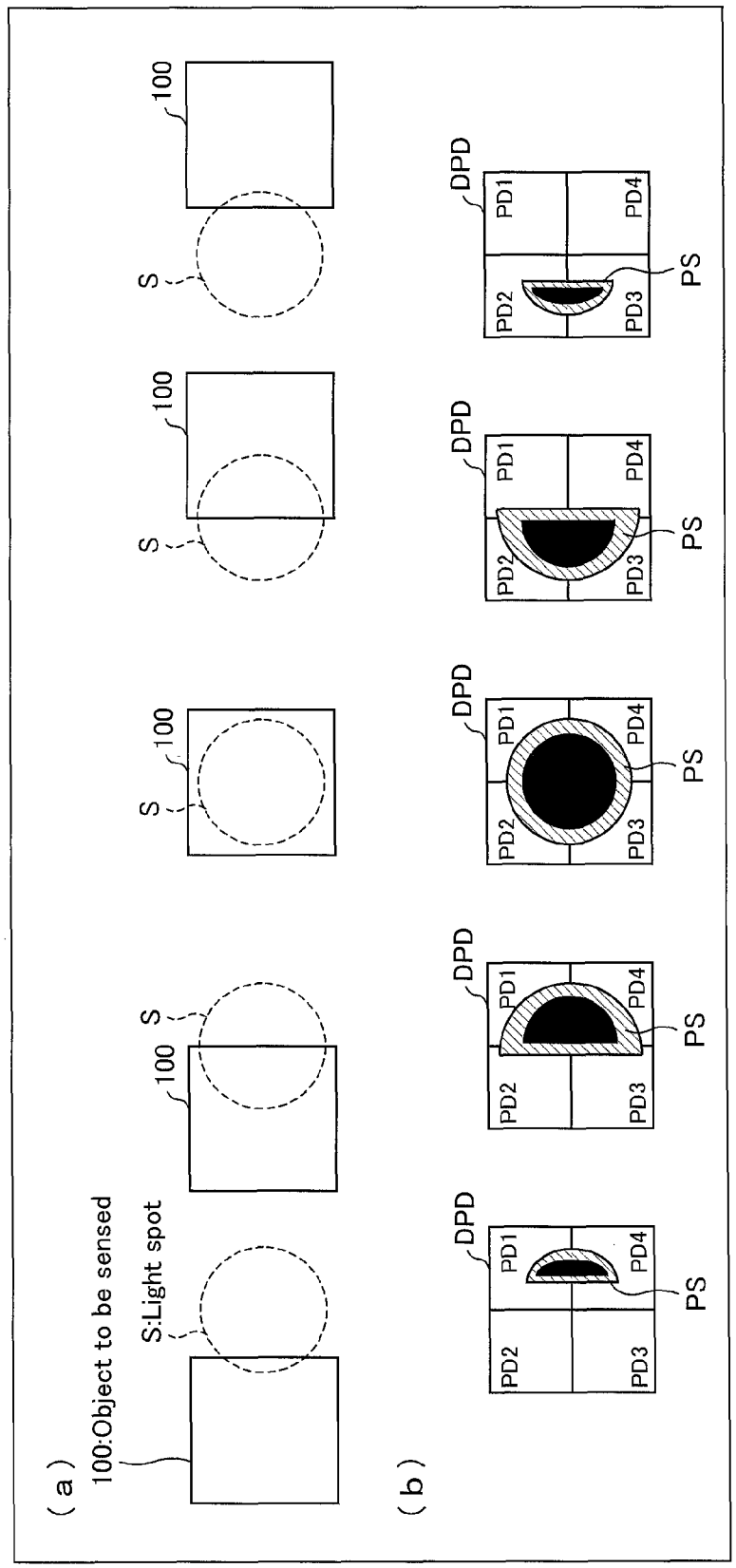
FIG. 12 is a view schematically illustrating a situation where a light receiving/emitting unit of the aforementioned optical sensor receives light reflected from an object to be sensed.

FIG. 12 is a view schematically illustrating a situation where the light receiving/emitting unit 90 receives light reflected from the object to be sensed 100. FIG. 12(a) illustrates a situation where the object to be sensed 100 moves in one direction. FIG. 12(b) is a view illustrating a situation where an image PS projected on the divided light-receiving element DPD changes correspondingly to (a). Here, the image PS projected on the divided light-receiving element DPD represents a region on which light emitted from the light-emitting element LED and reflected by the object to be sensed 100 is incident.

As illustrated in FIG. 12(a), the object to be sensed 100 moves in one direction so as to cross a light spot S formed by light emitted from the light-emitting element LED. In accordance with the movement, a part of the light spot S, which is reflected by the object to be sensed 100, changes. Then, correspondingly to the change, the image PS projected on the divided light-receiving element DPD changes as illustrated in FIG. 12(b).

The light reflected from the object to be sensed 100 is projected on the divided light-receiving element DPD by the light-receiving lens portion 92b as an inverted image. Accordingly, in a case where the object to be sensed 100 exists on a left side of the light spot S, the reflection light is projected on the light-receiving elements PD1 and PD4, and the light-receiving elements PD1 and PD4 generate photocurrents in proportion to intensity of entering light. When the object to be sensed 100 moves, even a right-side part of the light spot S is to be reflected by the object to be sensed 100. When the object to be sensed 100 moves to a position at which a whole of the light spot S is reflected, a whole (a large part) of the divided light-receiving element DPD is incident with the reflection light. When the object to be sensed 100 further moves, only a right-side part of the light spot S is reflected by the object to be sensed 100, and the reflection light is projected only on the light-receiving elements PD2 and PD3.

Figure 13:
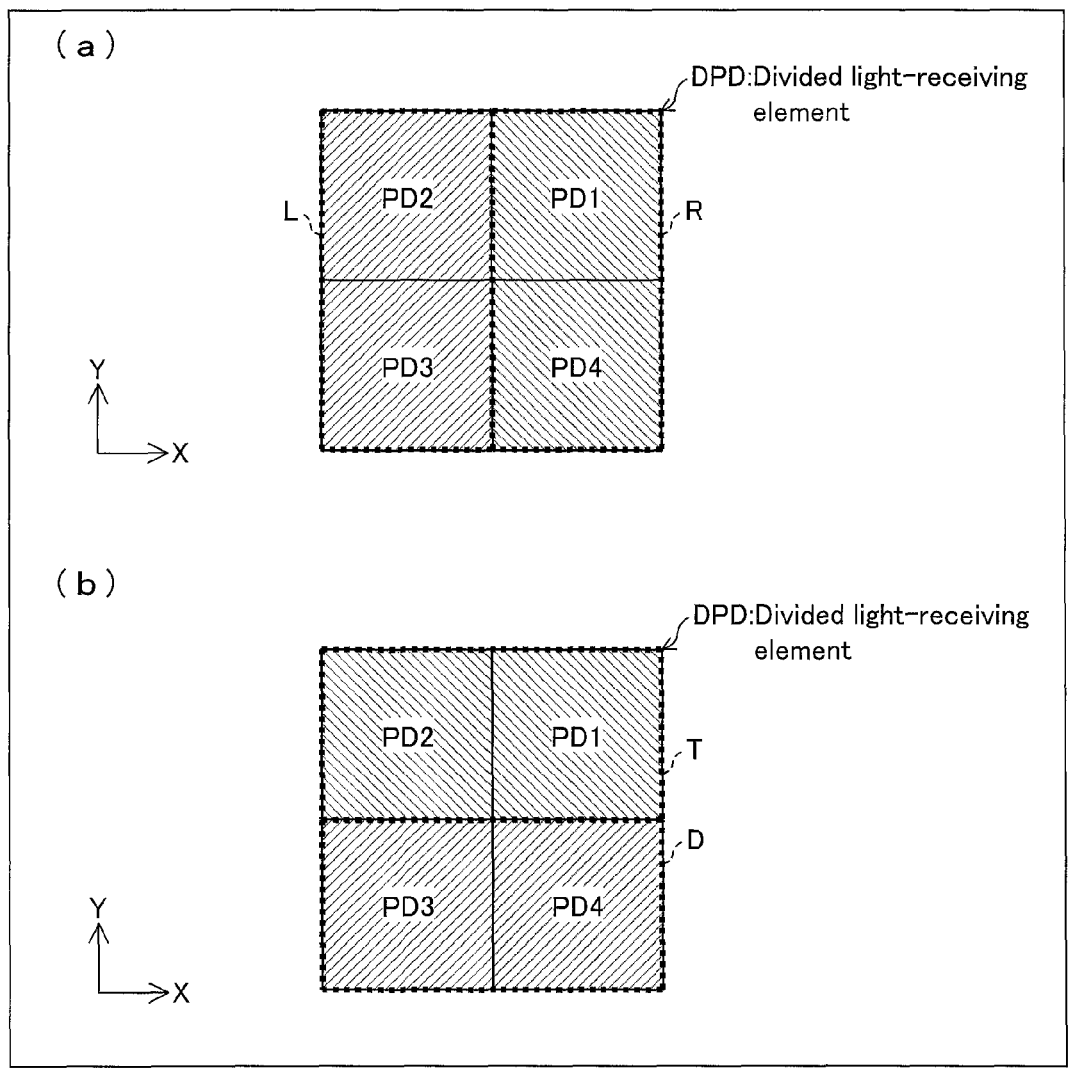
FIG. 13 is a view schematically illustrating an operation of the aforementioned divided light-receiving element.

FIG. 13 is a view schematically illustrating an operation of the divided light-receiving element DPD. FIG. 13(a) illustrates a configuration when the optical sensor 101 senses a movement of the object to be sensed 100 in a left and right direction, and FIG. 13(b) illustrates a configuration when the optical sensor 101 senses a movement of the object to be sensed 100 in an up and down direction. In FIG. 13, coordinate axes indicated with X and Y correspond to the coordinate axes indicated in FIG. 2. Here, the left and right direction represents a negative and positive direction of the X axis indicated in FIG. 13(a). Moreover, the up and down direction represents a positive and negative direction of the Y axis indicated in FIG. 13(b).

When the optical sensor 101 senses the movement of the object to be sensed 100 in the left and right direction, the divided light-receiving element DPD is divided into an L group (PD2 and PD3) and an R group (PD1 and PD4) indicated with reference signs of "L" and "R" in FIG. 13(a), respectively. Then, by using photocurrents generated from the light-receiving elements included in the L group and photocurrents generated from the light-receiving elements included in the R group, the movement of the object to be sensed 100 in the left and right direction is sensed.

When the optical sensor 101 senses the movement of the object to be sensed 100 in the up and down direction, the divided light-receiving element DPD is divided into a T group (PD1 and PD2) and a D group (PD3 and PD4) indicated with reference signs of "T" and "D" in FIG. 13(b), respectively. Then, by using photocurrents generated from the light-receiving elements included in the T group and photocurrents generated from the light-receiving elements included in the D group, the movement of the object to be sensed 100 in the up and down direction is sensed.

That is, by detecting a difference in the photocurrents of the light-receiving elements PD1 to PD4, it is possible to detect a relative position of the object to be sensed 100 with respect to the light receiving/emitting unit 90. Then, by detecting a temporal change of the position of the object to be sensed 100, it is possible to specify a moving speed and a moving direction of the object to be sensed 100.

Figure 14:
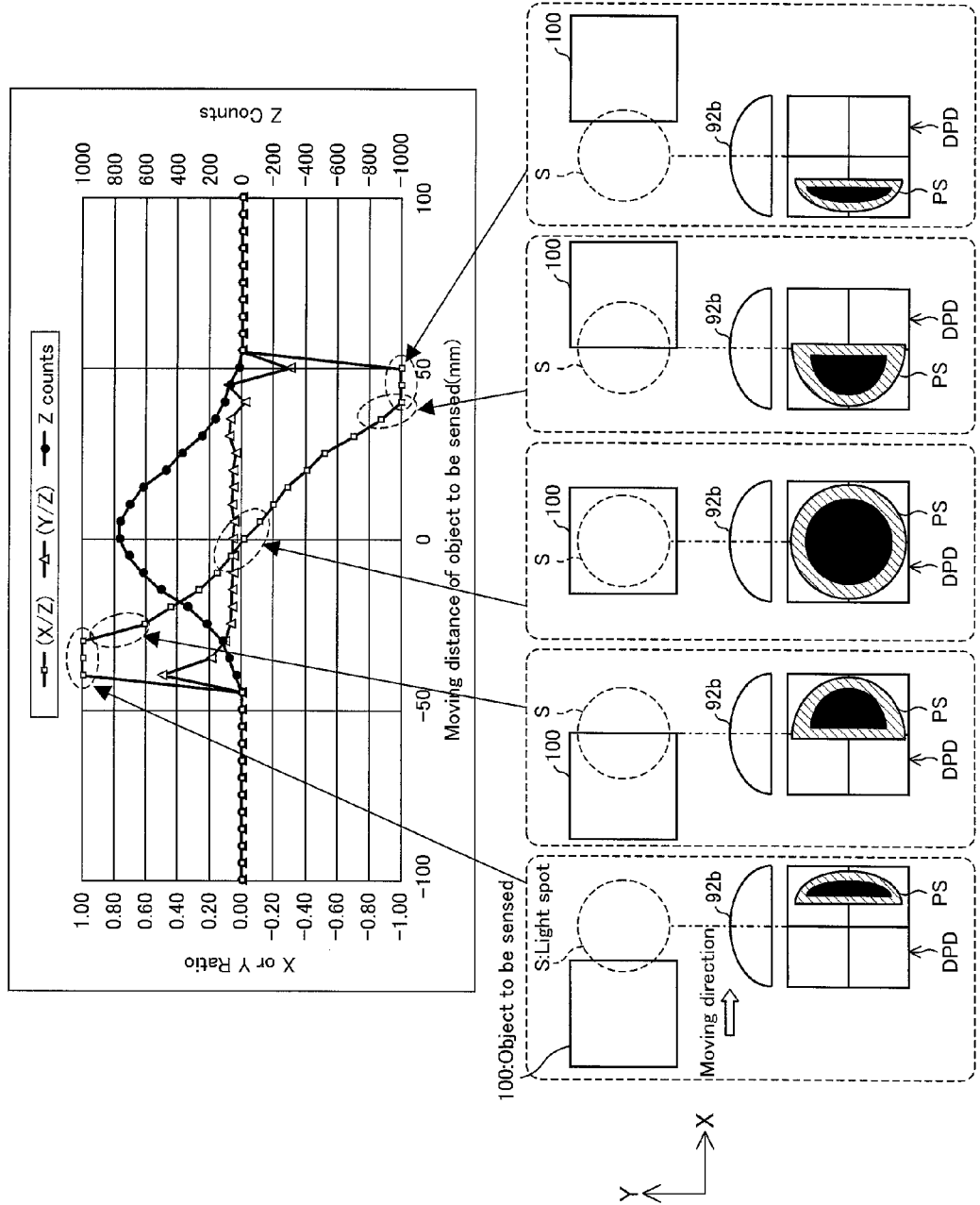
FIG. 14 is a view schematically illustrating an operation of the optical sensor when the aforementioned optical sensor senses a movement of the object to be sensed.

FIG. 14 is a view schematically illustrating an operation when the optical sensor 101 senses a movement of the object to be sensed 100. As an actual difference output of the photocurrents obtained from the light-receiving elements PD1 to PD4, a signal as indicated in FIG. 14 is able to be obtained, for example. As a signal for detecting the left and right (X) direction, a signal of ratio (X/Z) obtained by dividing X=(I_PD1+I_PD4)−(I_PD2+I_PD3), which is a difference of outputs of the photocurrents obtained from the left and the right in the divided light-receiving element DPD (L, R), by Z=(I_PD1+I_PD2+I_PD3+I_PD4), which is a sum of outputs from all of the four light-receiving elements PD1 to PD4 included in the divided light-receiving element DPD, is used. Here, I_PD1 represents a digital integrated value indicating the photocurrent obtained from the light-receiving element PD1. It is also similar to I_PD2 to I_PD4. Then, by detecting a temporal change in the value of X/Z, it is possible to detect a moving direction and a moving speed of the object to be sensed 100 in the X axis.

Similarly, as a signal for detecting the up and down (Y) direction, a signal of ratio (Y/Z) obtained by dividing Y=(I_PD1+I_PD2)−(I_PD3+I_PD4), which is a difference of outputs from the up and the down in the divided light-receiving element DPD (T, D), by Z=(I_PD1+I_PD2+I_PD3+I_PD4), which is the sum of the outputs from all of the four light-receiving elements PD1 to PD4 included in the divided light-receiving element DPD, may be used. Similarly, by detecting a temporal change in the value of Y/Z, it is possible to detect a moving direction and a moving speed of the object to be sensed 100 in the Y axis.

Embodiment 2

In the present embodiment, the first period to the (2n+1)th period of Embodiment 1 are set as one period group, and the period group is repeated an even number of times. The configuration of the optical sensor 101 is similar to that of Embodiment 1. However, the numbers of integrators and delay units of the integrating circuit 11 change according to the number of integration periods.

Figure 15:
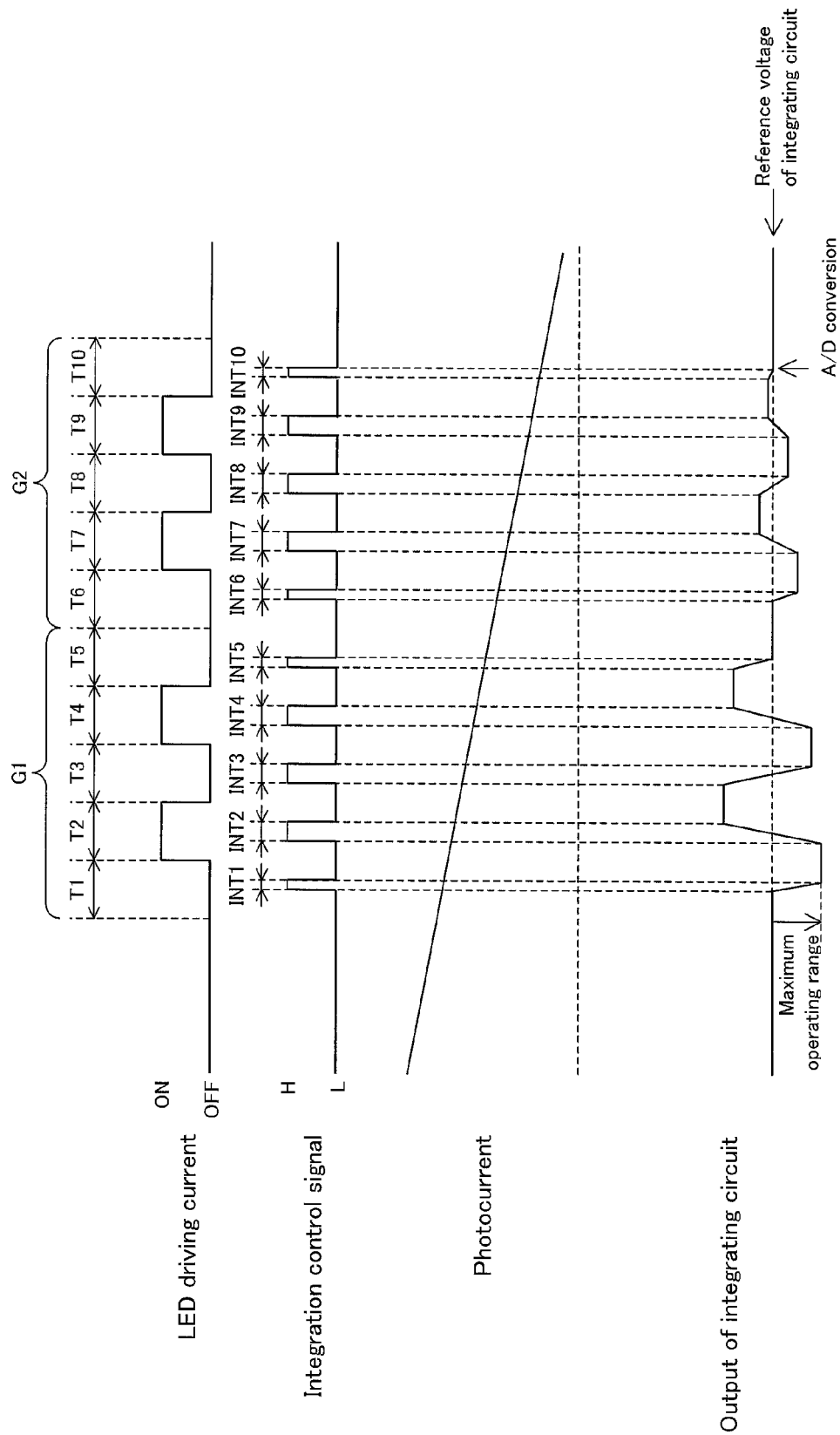
FIG. 15 is a timing chart illustrating an operation of an optical sensor according to another embodiment of the invention in a case where disturbance light decreases at a constant rate.

FIG. 15 is a timing chart illustrating an operation of the optical sensor 101 in the present embodiment in a case where disturbance light decreases at a constant rate. The optical sensor 101 includes a first period group G1 and a second period group G2, which is subsequent thereto, in a period during which a detection operation is performed. The optical sensor 101 continuously repeats processing of one period group an even number of times. Here, the processing of the period group is repeated twice.

The first period group G1 includes the first period T1 to the fifth period T5. The light-emitting element LED repeats non-light emission (OFF) and light emission (ON) alternately for each period of the first period T1 to the fifth period T5. The light-emitting element LED is to be OFF in the first period T1, the third period T3, and the fifth period T5, and is to be ON in the second period T2 and the fourth period T4.

The first period group G1 includes the integration periods INT1 to INT5 which correspond to the first period T1 to the fifth period T5, respectively. The integrating circuit performs integration in the negative direction for the integration periods INT1, INT3, and INT5, and performs integration in the positive direction for the integration periods INT2 and INT4. That is, the integrating circuit performs integration in the positive direction in the integration periods during which the light-emitting element LED emits light, and performs integration in the negative direction in the integration periods during which the light-emitting element LED does not emit light.

Further, each length of the integration period INT1 which is the first in the first period group G1 and the integration period INT5 which is the last in the first period group G1 is half the length of another integration period (such as INT2). Each length of the other integration periods INT2 to INT4 is the same. In addition, intervals between the respective integration periods INT1 to INT5 (lengths of periods during which integration is not performed) are the same in the first period group G1.

Compared to the example of the operation of FIG. 9, the processing in the first period group G1 is the same except that the number of integration periods in the middle (2 to 2n) is different.

In the second period group G2, processing same as that of the first period group G1 is repeated. That is, the second period group G2 includes the sixth period T6 to a tenth period T10. The light-emitting element LED is to be OFF in the sixth period T6, the eighth period T8, and the tenth period T10, and is to be ON in the seventh period T7 and the ninth period T9.

From the fifth period T5 to the sixth period T6, the OFF-periods are continuous. Each of the first period T1 to the tenth period T10 has the same length.

The second period group G2 includes the integration periods INT6 to INT10 which correspond to the sixth period T6 to the tenth period T10, respectively. The integrating circuit performs integration in the negative direction for the integration periods INT6, INT8, and INT10, and performs integration in the positive direction for the integration periods INT7 and INT9.

Each length of the integration period INT6 which is the first in the second period group G2 and the integration period INT10 which is the last in the second period group G2 is half the length of another integration period (such as INT7). Each length of the other integration periods INT1 to INT9 is the same. In addition, intervals between the respective integration periods INT6 to INT10 (lengths of periods during which integration is not performed) are the same also in the second period group G2. However, an interval between the integration period INT5 and the integration period INT6 (length of a period during which integration is not performed) is different from the other intervals.

Similarly to Embodiment 1, in a case where the object to be sensed 100 exists, the integrating circuit 11 of the optical sensor 101 is able to output an integrated value in accordance with light reflected from the object to be sensed 100. (When Disturbance Light Changes at a Constant Rate)

Next, a case where there is no object to be sensed 100 and disturbance light decreases at a constant rate will be described with reference to FIG. 15. According to a fluctuation of the disturbance light, a photocurrent decreases at a constant rate in the first period T1 to the tenth period T10.

Similarly to the case described in Embodiment 1 (FIG. 9), by an action of the integration periods INT1 and INT5 whose time widths are the half, integrated values of the photocurrent due to the disturbance light which changes linearly are offset in the first period group G1. Thus, an integrated value obtained by adding becomes 0 at a time point when the first period group G1 ends.

Similarly, also in the period group G2, integrated values of the photocurrent due to the disturbance light which changes linearly are offset. Finally, the integrating circuit 11 outputs 0 as the integrated value obtained by adding, which is converted into a digital integrated value by the AD converter 21.

(When Disturbance Light Changes Periodically)

Figure 16:
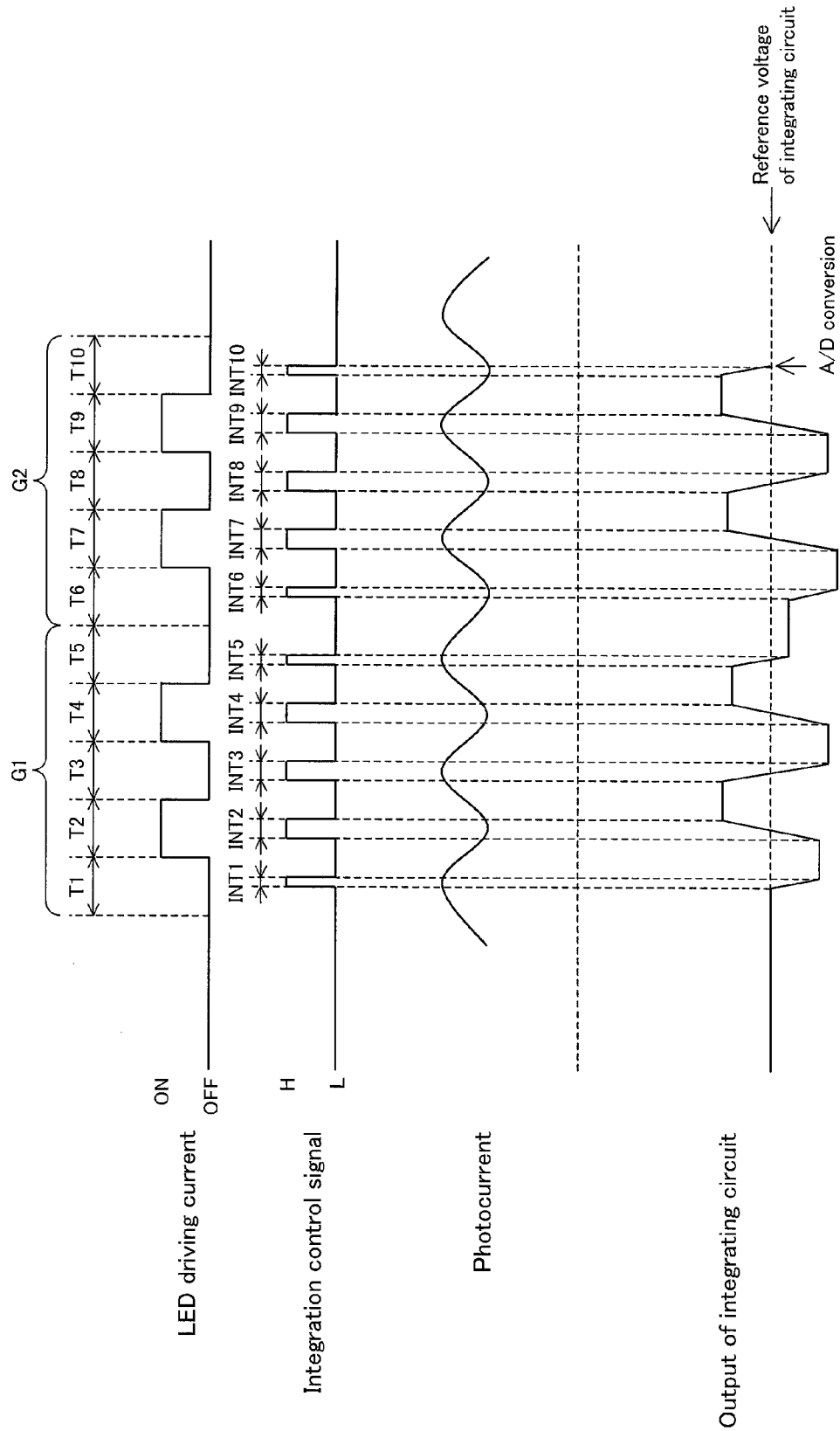
FIG. 16 is a timing chart illustrating an operation of the optical sensor according to another embodiment of the invention in a case where disturbance light changes periodically.

Next, a case where there is no object to be sensed 100 and disturbance light changes periodically will be described with reference to FIG. 16. FIG. 16 is a timing chart illustrating an operation of the optical sensor 101 of the present embodiment in a case where the disturbance light changes periodically. The timings of ON/OFF of the light-emitting element and the timing of integration are the same as those of the case illustrated in FIG. 15. According to a fluctuation of the disturbance light, a photocurrent changes periodically in the first period T1 to the tenth period T10. Here, considered is a case where a fluctuation frequency of the disturbance light matches with a frequency of ON/OFF of the light-emitting element LED as illustrated in FIG. 16. The fluctuation frequency of the disturbance light illustrated in FIG. 16 is the same as the fluctuation frequency of the disturbance light illustrated in FIG. 10.

At this time, the fluctuation frequency of the disturbance light matches with a frequency of integration in the positive direction. In the first period group G1, the disturbance light (and the photocurrent) is small in the integration periods in the positive direction and great in the integration periods in the negative direction. On the other hand, in the second period group G2, the disturbance light (and the photocurrent) is great in the integration periods in the positive direction and small in the integration periods in the negative direction. This is because the integration periods in the negative direction are continuous from the integration period INT5 which is the last of the first period group G1 to the integration period INT6 which is the first of the second period group G2.

In the first period group G1, the photocurrent in the integration periods during which integration is performed in the positive direction (INT2 and INT4) is always smaller than the photocurrent in the integration periods during which integration is performed in the negative direction (INT1, INT3, and INT5). Accordingly, a difference of integrated values remains at a time point when the integration period INT5 which is the last of the first period group G1 ends.

However, in the second period group G2, a phase of the photocurrent deviates at 180° with respect to that of the first period group G1. Accordingly, integrated values in the second period group G2 have a polarity opposite to and an absolute value same as those of the integrated values in the first period group G1. Thus, the integrated values in the first period group G1 are offset by integration in the second period group G2. Finally, the integrating circuit 11 outputs 0 as an integrated value obtained by adding.

Note that, though the case where the frequency of ON/OFF of the light-emitting element LED completely matches with the fluctuation frequency of the disturbance light has been described above, there is no limitation thereto, and even in a case where a frequency of ON/OFF of the light-emitting element LED and a fluctuation frequency of disturbance light are close to each other, the optical sensor 101 of the present embodiment is able to reduce an influence due to the disturbance light. Integrated values in the first period group G1 and integrated values in the second period group G2 become values which are offset by each other.

To summarize, the optical sensor 101 of the present embodiment is able to reduce an influence due to disturbance light which changes linearly and to prevent erroneous detection (malfunction). Furthermore, the optical sensor 101 of the present embodiment is also able to reduce an influence due to disturbance light which fluctuates with a frequency almost same as a frequency of ON/OFF of the light-emitting element LED. The optical sensor 101 is thus able to generate a stable detection signal even when there is disturbance light of an inverter fluorescent lamp or the like.

Embodiment 3

In the present embodiment, the first period to the (2n+1)th period of Embodiment 1 are set as one period group, and the period group is repeated an even number of times. However, in the present embodiment, a pause period of integration is provided between the period groups. The configuration of the optical sensor 101 is similar to as that of Embodiment 1. However, the numbers of integrators and delay units of the integrating circuit 11 change according to the number of integration periods.

Figure 17:
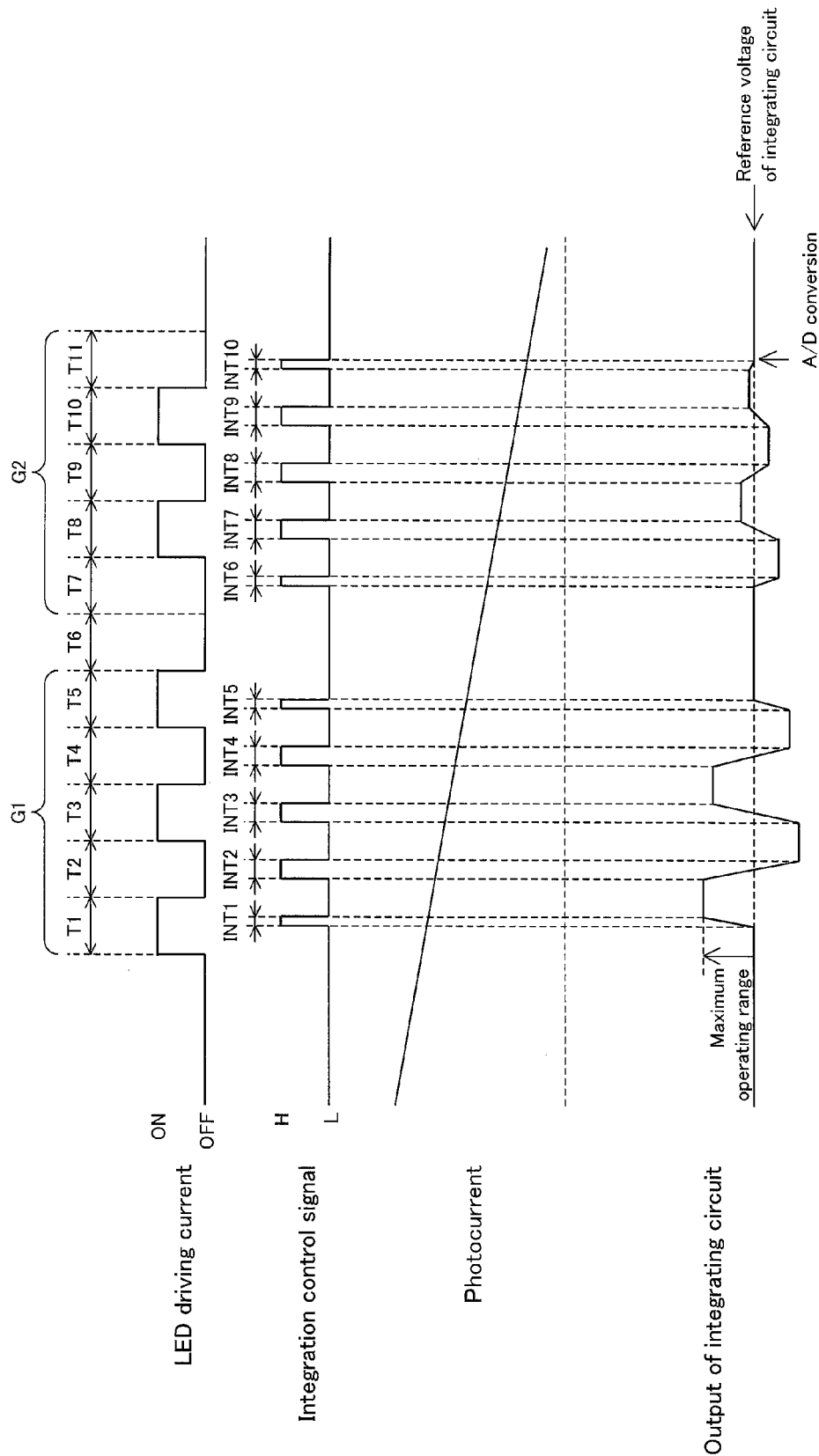
FIG. 17 is a timing chart illustrating an operation of an optical sensor according to still another embodiment of the invention in a case where disturbance light decreases at a constant rate.

FIG. 17 is a timing chart illustrating an operation of the optical sensor 101 of the present embodiment in a case where disturbance light decreases at a constant rate. The optical sensor 101 includes the first period group G1, the pause period (the sixth period T6), and the second period group G2 in a period during which a detection operation is performed.

The first period group G1 of the present embodiment is different from the first period group G1 of Embodiment 2 only in that ON/OFF of the light-emitting element LED and directions of integration are inverted, and acts in the substantially same manner. The first period group G1 includes the first period T1 to the fifth period T5. The light-emitting element LED repeats light emission (ON) and non-light emission (OFF) alternately for each period of the first period T1 to the fifth period T5. The light-emitting element LED is to be ON in the first period T1, the third period T3, and the fifth period T5, and is to be OFF in the second period T2 and the fourth period T4.

The first period group G1 includes the integration periods INT1 to INT5 which correspond to the first period T1 to the fifth period T5, respectively. The integrating circuit performs integration in the positive direction for the integration periods INT1, INT3, and INT5, and performs integration in the negative direction for the integration periods INT2 and INT4. That is, the integrating circuit performs integration in the positive direction in the integration periods during which the light-emitting element LED emits light, and performs integration in the negative direction in the integration periods during which the light-emitting element LED does not emit light.

Further, each length of the integration period INT1 which is the first in the first period group G1 and the integration period INT5 which is the last in the first period group G1 is half the length of another integration period (such as INT2).

Subsequently to the first period group G1, the sixth period T6 is provided as the pause period. The integrating circuit does not perform integration in the sixth period T6. Note that, in the sixth period T6, the light-emitting element LED may or may not emit light, but the light-emitting element LED here does not emit light for reducing power consumption.

Subsequently to the sixth period T6, the second period group G2 is provided. Compared to the first period group G1, the second period G2 is different in that ON/OFF of the light-emitting element LED and directions of integration are inverted. The second period group G2 includes the seventh period T7 to an eleventh period T11. The light-emitting element LED is to be OFF in the seventh period T7, the ninth period T9, and the eleventh period T11, and is to be ON in the eighth period T8 and the tenth period T10.

Each of the first period T1 to the eleventh period T11 has the same length.

The second period group G2 includes the integration periods INT6 to INT10 which correspond to the seventh period T7 to the eleventh period T11, respectively. The integrating circuit performs integration in the negative direction for the integration periods INT6, INT8, and INT10, and performs integration in the positive direction for the integration periods INT7 and INT9.

Each length of the integration period INT6 which is the first in the second period group G2 and the integration period INT10 which is the last in the second period group G2 is half the length of another integration period (such as INT7). Each length of the other integration periods INT7 to INT9 is the same.

Similarly to Embodiment 1, in a case where the object to be sensed 100 exists, the integrating circuit 11 of the optical sensor 101 is able to output an integrated value in accordance with light reflected from the object to be sensed 100.

(When Disturbance Light Changes at a Constant Rate)

Next, a case where there is no object to be sensed 100 and disturbance light decreases at a constant rate will be described with reference to FIG. 17. According to a fluctuation of the disturbance light, a photocurrent decreases at a constant rate in the first period T1 to the eleventh period T11.

Similarly to the case described in Embodiment 1 (FIG. 9), by an action of the integration periods INT1 and INT5 whose time widths are the half, integrated values of the photocurrent due to the disturbance light which changes linearly are offset in the first period group G1. Thus, an integrated value obtained by adding becomes 0 at a time point when the first period group G1 ends.

Similarly, also in the second period group G2, integrated values of the photocurrent due to the disturbance light which changes linearly are offset. Finally, the integrating circuit 11 outputs 0 as the integrated value obtained by adding, which is converted into a digital integrated value by the AD converter 21.

(When Disturbance Light Changes Periodically)

Figure 18:
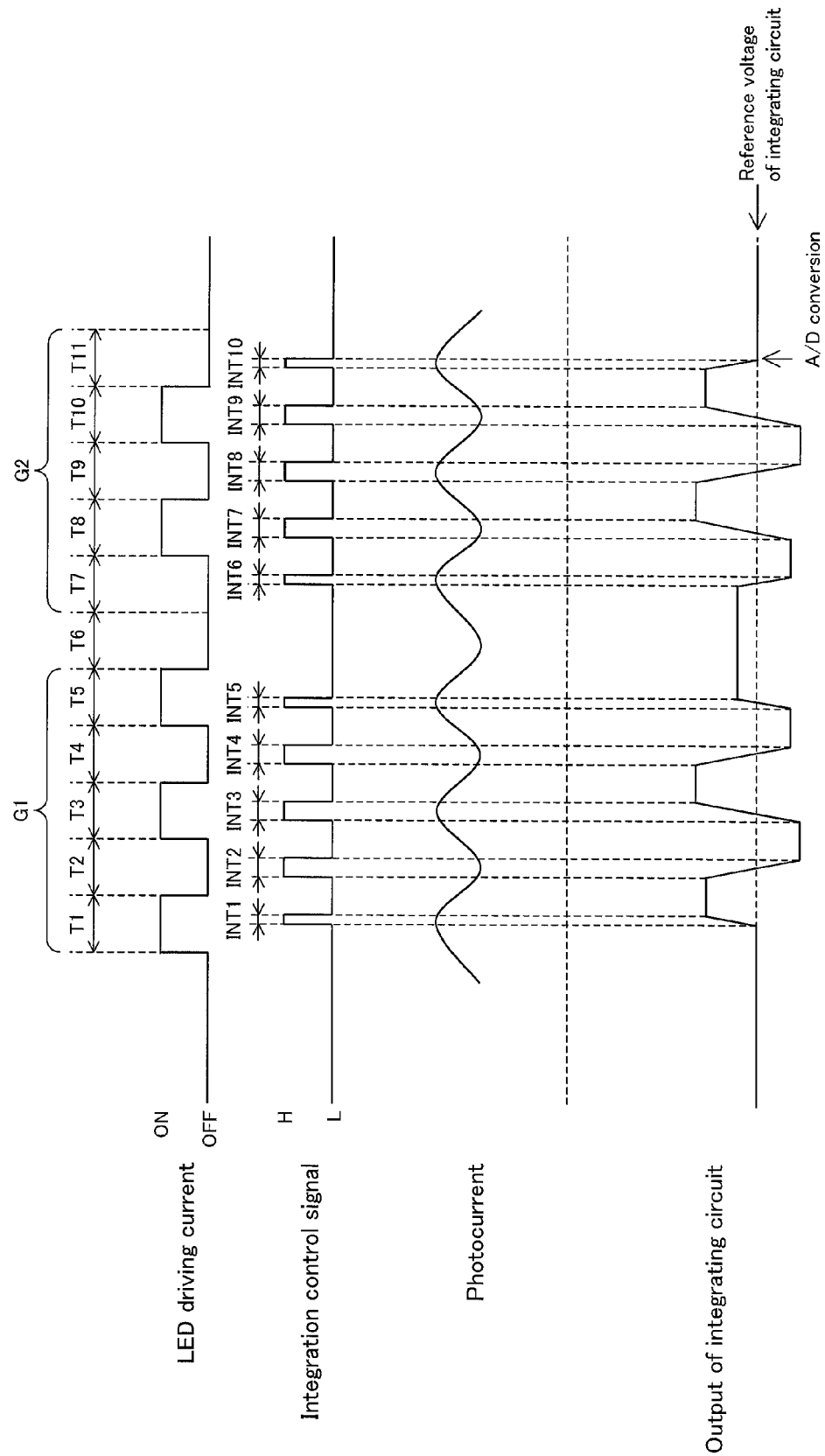
FIG. 18 is a timing chart illustrating an operation of the optical sensor according to still another embodiment of the invention in a case where disturbance light changes periodically.

Next, a case where there is no object to be sensed 100 and disturbance light changes periodically will be described with reference to FIG. 18. FIG. 18 is a timing chart illustrating an operation of the optical sensor 101 of the present embodiment in a case where the disturbance light changes periodically. The timings of ON/OFF of the light-emitting element and the timing of integration are the same as those of the case illustrated in FIG. 17. According to a fluctuation of the disturbance light, a photocurrent changes periodically in the first period T1 to the eleventh period T11. Here, considered is a case where a fluctuation frequency of the disturbance light matches with a frequency of ON/OFF of the light-emitting element LED as illustrated in FIG. 18. The fluctuation frequency of the disturbance light illustrated in FIG. 18 is the same as the fluctuation frequency of the disturbance light illustrated in FIG. 10.

At this time, the fluctuation frequency of the disturbance light matches with a frequency of integration in the positive direction. In the first period group G1, the disturbance light (and the photocurrent) is great in the integration periods in the positive direction and small in the integration periods in the negative direction. On the other hand, in the second period group G2, the disturbance light (and the photocurrent) is small in the integration periods in the positive direction and great in the integration periods in the negative direction. This is because the pause period (sixth period T6) during which integration is not performed exists between the integration period INT5 which is the last of the first period group G1 and the integration period INT6 which is the first of the second period group G2.

Integrated values which are positive remain as a difference at a time point when the integration period INT5 which is the last of the first period group G1 ends.

However, in the second period group G2, a phase of the photocurrent deviates at 180° with respect to that of the first period group G1. Accordingly, integrated values in the second period group G2 have a polarity opposite to and an absolute value same as those of the integrated values in the first period group G1. Thus, the integrated values in the first period group G1 are offset by integration in the second period group G2. Finally, the integrating circuit 11 outputs 0 as an integrated value obtained by adding.

Note that, though the case where the frequency of ON/OFF of the light-emitting element LED completely matches with the fluctuation frequency of the disturbance light has been described above, there is no limitation thereto, and even in a case where a frequency of ON/OFF of the light-emitting element LED and a fluctuation frequency of disturbance light are close to each other, the optical sensor 101 of the present embodiment is able to reduce an influence due to the disturbance light. Integrated values in the first period group G1 and integrated values in the second period group G2 become values which are offset by each other.

In addition, in the present embodiment, the integration periods whose time widths are the half exist in both of the period during which the light-emitting element LED is ON and the period during which it is OFF. Thus, even in a case where there is an error of a time width of integration, positive and negative integration periods becomes more symmetrical, so that integration with high accuracy is enabled.

Note that, a length of the pause period (sixth period T6) may be different from that of another period (such as the second period T2). Though phase deviation of the photocurrent due to the disturbance light which changes periodically changes according to the length of the pause period, it is possible to reduce an influence due to the disturbance light even when the length of the pause period is not the same as that of another period. However, against disturbance light with such a high fluctuation frequency that matches with the frequency of ON/OFF of the light-emitting element LED, the effect of reducing an influence due to the disturbance light is achieved most when the length of the pause period and the length of another period (such as the second period T2) are the same.

Moreover, in a case where four period groups are provided, the pause period is provided between the first period group G1 and the second period group G2, and the pause period is provided also between a third period group G3 and a fourth period group G4. The pause period may be or may not be provided between the second period group G2 and the third period group G3. In the third period group G3 and the fourth period group G4, turn-on/turn-off in the respective periods are inverted mutually. In addition, in the third period group G3 and the fourth period group G4, the optical sensor may perform an operation similar to that of the first period group G1 and the second period group G2, respectively, and may perform the operation similar to that of the second period group G2 and the first period group G1, respectively. It is similar also to a case where an even number of period groups, which is more than four, are provided.

To summarize, the optical sensor 101 of the present embodiment is able to reduce not only an influence due to disturbance light which changes linearly but also an influence due to disturbance light which fluctuates with a frequency almost the same as a frequency of the ON/OFF of the light-emitting element LED. The optical sensor 101 is thus able to generate a stable detection signal even when there is disturbance light of an inverter fluorescent lamp or the like.

Embodiment 4

Figure 19:
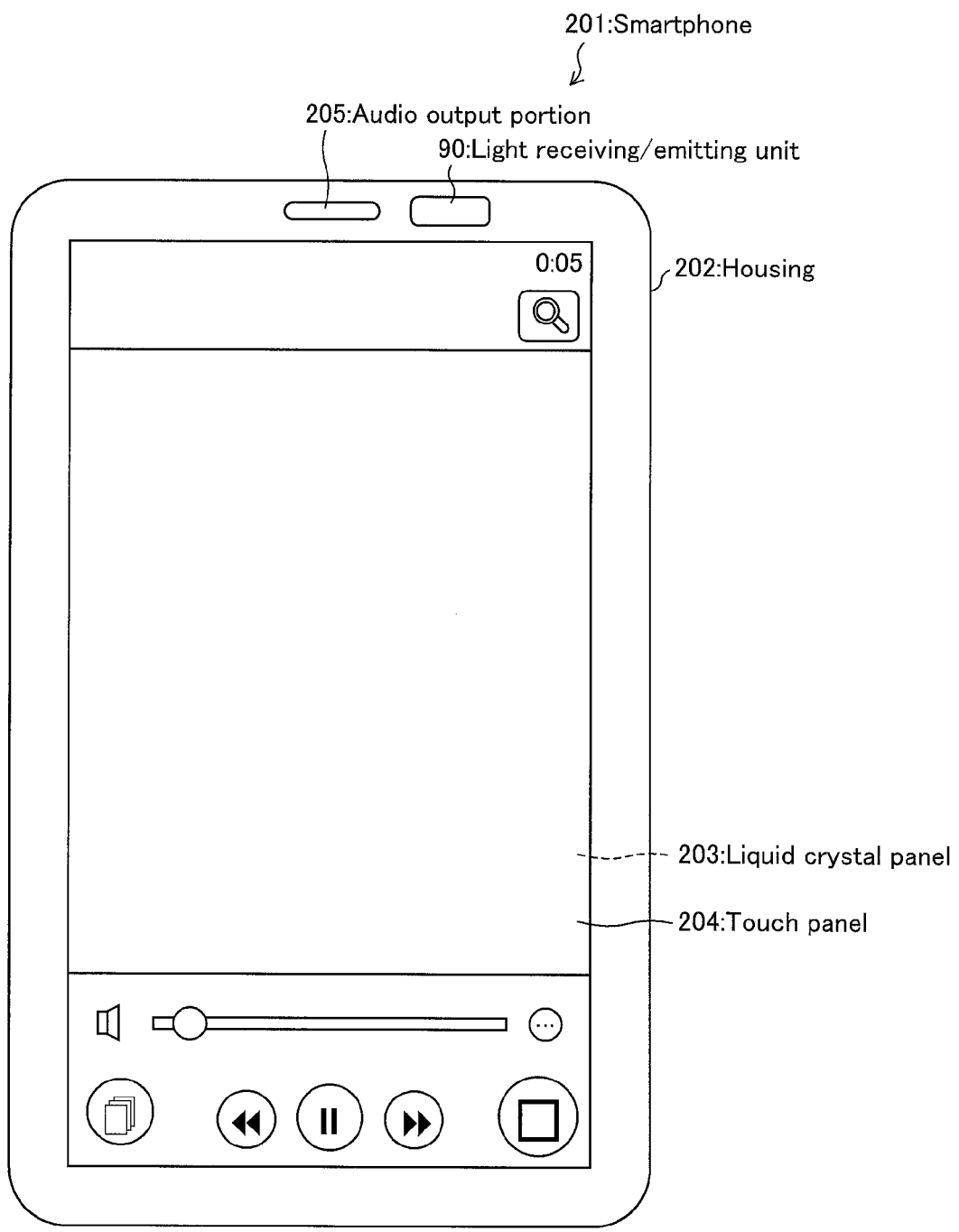
FIG. 19 is a plan view illustrating a configuration of a smartphone according to yet another embodiment of the invention.
Figure 20:
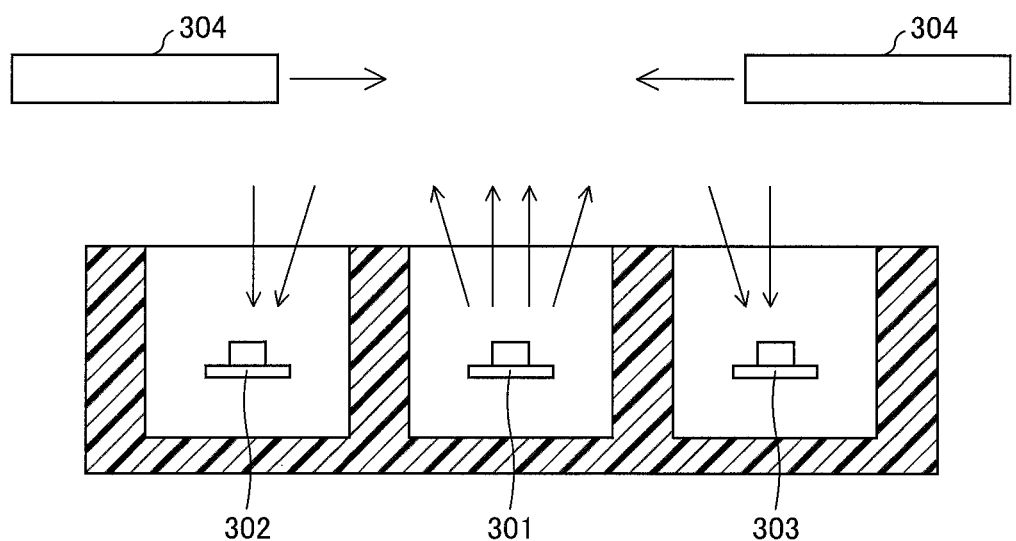
FIG. 20 is a vertical section view illustrating a configuration in a section of an optical sensor according to the related art.

FIG. 19 is a plan view illustrating a configuration of a smartphone according to the present embodiment. A smartphone 201 as an electronic device is configured by having a liquid crystal panel 203 and a touch panel 204 incorporated in a housing 202. In the smartphone 201, the liquid crystal panel 203 is provided in a side of an operation surface of the housing 202. Moreover, the touch panel 204 is provided onto the liquid crystal panel 203.

In an upper part of the operation surface in the housing 202, an audio output portion 205 and the light receiving/emitting unit 90 are arranged. The audio output portion 205 is provided in order to output a voice in a case where the smartphone 201 is used as a telephone and various sounds in accordance with an operation of an application program.

The light receiving/emitting unit 90 is a light receiving/emitting portion which is provided in order to sense the object to be sensed 100 (for example, a face of a user) in close proximity and sense a gesture operation. In addition, the smartphone 201 has the optical sensor 101 embedded therein.

By including the optical sensor 101 as described above, even when being used in an environment where disturbance light occurs, the smartphone 201 is able to correctly sense a position and a motion of the object to be sensed 100 without being influenced by the disturbance light.

By applying the optical sensor 101 not only to the smartphone but also to various electronic devices such as a digital camera and a car navigation system, it is possible to mount a sensing function, which allows correctly sensing a position or a moving direction of an object to be sensed even when disturbance light exists, on the electronic devices.

SUMMARY

An optical sensor 101 according to an aspect 1 of the invention includes: a light-emitting element LED which turns off and turns on alternately for each of a plurality of continuous periods constituting a period group; a light-receiving element PD1 which receives light emitted from the light-emitting element and reflected by an object to be sensed 100 and which generates a photocurrent; and an integrating unit (integrating circuit 11, 1A) which integrates the photocurrent in a first polarity direction (a positive direction or a negative direction) in a period during which the light-emitting element turns on and integrates the photocurrent in a second polarity direction opposite to the first polarity direction (the negative direction or the positive direction) in a period during which the light-emitting element turns off, in which a sum of a length of an integration period (INT1) in a first period of the period group and a length of an integration period (INT9) in a last period of the period group is same as a length of one integration period (INT2) in a period other than the first period and the last period in the period group.

With the aforementioned configuration, it is possible to offset an influence of a photocurrent due to disturbance light, which changes linearly, by integration in the positive direction and integration in the negative direction. Moreover, since each of the first and the last integration periods is shorter than an integration period in a period other than the first period and the last period, it is possible to reduce an influence of a photocurrent due to disturbance light which fluctuates with a higher frequency. Further, since the first integration period is shorter than the next integration period, it is possible to prevent integrated values of the photocurrent due to the disturbance light from being saturated.

Note that, light emitted from the light-emitting element only needs to be darker during a turning-off period than a turning-on period, and may not turn off completely during the turning-off period.

An optical sensor according to an aspect 2 of the invention may have a configuration in which, in the aspect 1, the period group is composed of $2n+1$ continuous periods, where n is a natural number, the light-emitting element turns off and turns on alternately for each of the periods from a first period to a $(2n+1)$th period, and a length of the integration period in the first period and a length of the integration period in the $(2n+1)$th period are same.

With the aforementioned configuration, each of the length of the first integration period and the length of the last integration period is half the length of an integration period in a period other than the first period and the last period. Since the integration period in the first polarity direction and the integration period in the second polarity direction become highly symmetrical in the period group, it is possible to further reduce the influence of the photocurrent due to the disturbance light.

In an optical sensor according to an aspect 3 of the invention, it is possible to set a length of the integration period in each of the periods other than the first and the last periods in the period group to be same, in the aforementioned aspect 1 or 2.

In an optical sensor according to an aspect 4 of the invention, it is possible to set intervals between the integration periods to be same in the period group in the aforementioned aspects 1 to 3.

With the aforementioned configuration, since the integration period in the first polarity direction and the integration period in the second polarity direction become highly symmetrical in the period group, it is possible to further reduce the influence of the photocurrent due to the disturbance light.

An optical sensor according to an aspect 5 of the invention may have a configuration in which, in the aforementioned aspects 1 to 4, the optical sensor has an even number of continuous period groups and the light-emitting element turns on in the first period in each of the period groups or turns off in the first period in each of the period groups.

With the aforementioned configuration, the light-emitting element and the integrating unit repeat an operation of the period group an even number of times continuously. Accordingly, even in a case where a fluctuation frequency of disturbance light matches with a frequency of integration in the first polarity direction, a phase of a photocurrent due to the disturbance light deviates in the plurality of continuous period groups. Thus, it is possible to offset the influence of the photocurrent due to the disturbance light between the plurality of continuous period groups.

An optical sensor according to an aspect 6 of the invention may have a configuration in which, in the aforementioned aspects 1 to 4, the optical sensor has a first period group and a second period group, each of which represents the period group, and a pause period provided between the first period group and the second period group, the light-emitting element turns on in the first period in the first period group and turns off in the first period in the second period group, or turns off in the first period in the first period group and turns on in the first period in the second period group, and the integrating unit does not perform integration in the pause period.

With the aforementioned configuration, even in a case where a fluctuation frequency of disturbance light matches with a frequency of integration in the first polarity direction, since the pause period is provided, a phase of a photocurrent due to the disturbance light deviates in the plurality of period groups. Thus, it is possible to offset the influence of the photocurrent due to the disturbance light between the plurality of continuous period groups.

An electronic device according to an aspect 7 of the invention includes the optical sensor of any of the aforementioned aspects 1 to 6.

The invention is not limited to each of the embodiments described above and can be modified variously within the scope indicated in the claims, and embodiments obtained by appropriately combining technical means disclosed in different embodiments are also included in the technical scope of the invention. Further, by combining the technical means disclosed in each of the embodiments, a new technical feature may be formed.

INDUSTRIAL APPLICABILITY

The invention is able to be applied to an optical sensor and an electronic device including the same.

REFERENCE SIGNS LIST 3 register
4 I2C interface
5 integration control signal generating circuit
6 oscillator
7 driving signal generating circuit
8 driving circuit
11 to 14, 1A integrating circuit
b1 to b9, 1Ab integrator
d1 to d8, 1Ad1 to 1Ad8 delay circuit
1e, 1Ae adding circuit
1a input switching circuit
1Ac output switching circuit
1Aa current polarity switching circuit
21 to 24 AD converter
90 light receiving/emitting unit
91 substrate
92 transparent resin portion
92a light-emitting lens portion
92b light-receiving lens portion
93 light shielding resin portion
100 object to be sensed
101 optical sensor
201 smartphone
DPD divided light-receiving element
PD1 to PD4 light-receiving element
LED light-emitting element

The invention claimed is:

1. An optical sensor, comprising:
a light-emitting element which turns off and turns on alternately for each of a plurality of continuous periods constituting a period group;
a light-receiving element which receives light emitted from the light-emitting element and reflected by an object to be sensed and which generates a photocurrent; and
an integrating circuit which integrates the photocurrent in a first polarity direction in a period during which the light-emitting element turns on and integrates the photocurrent in a second polarity direction opposite to the first polarity direction in a period during which the light-emitting element turns off, wherein
a sum of a length of an integration period in a first period of the period group and a length of an integration period in a last period of the period group is same as a length of one integration period in a period other than the first period and the last period in the period group.

2. The optical sensor according to claim 1, wherein
the period group is composed of 2n+1 continuous periods, where n is a natural number,
the light-emitting element turns off and turns on alternately for each of the periods from a first period to a (2n+1)th period, and
a length of the integration period in the first period and a length of the integration period in the (2n+1)th period are same.

3. The optical sensor according to claim 1, wherein
the optical sensor has an even number of continuous period groups and
the light-emitting element turns on in the first period in each of the period groups or turns off in the first period in each of the period groups.

4. The optical sensor according to claim 1, wherein
the optical sensor has a first period group and a second period group, each of which represents the period group, and a pause period provided between the first period group and the second period group,
the light-emitting element turns on in the first period in the first period group and turns off in the first period in the second period group, or turns off in the first period in the first period group and turns on in the first period in the second period group, and
the integrating circuit does not perform integration in the pause period.

5. An electronic device, comprising the optical sensor according to claim 1.

* * * * *